United States Patent
Herceg et al.

(10) Patent No.: US 7,586,500 B2
(45) Date of Patent: Sep. 8, 2009

(54) DYNAMIC RENDER ALGORITHM SELECTION

(75) Inventors: Marija Herceg, Lindfield (AU); Julian Benjamin Kelsey, Newtown (AU); Michael Anthony Martin, Macquarie Park (AU)

(73) Assignee: Canon Kabushiki Kaisha, Tokyo (JP)

( * ) Notice: Subject to any disclaimer, the term of this patent is extended or adjusted under 35 U.S.C. 154(b) by 584 days.

(21) Appl. No.: 11/229,800

(22) Filed: Sep. 20, 2005

(65) Prior Publication Data

US 2006/0066621 A1  Mar. 30, 2006

(30) Foreign Application Priority Data

Sep. 24, 2004 (AU) .............................. 2004905560

(51) Int. Cl.
G09G 5/00 (2006.01)
G06F 15/16 (2006.01)
(52) U.S. Cl. ..................................... 345/619; 345/502
(58) Field of Classification Search ................ 345/581, 345/582, 619, 502
See application file for complete search history.

(56) References Cited

U.S. PATENT DOCUMENTS

| | | | | |
|---|---|---|---|---|
| 5,388,206 A | * | 2/1995 | Poulton et al. | 345/505 |
| 5,982,399 A | * | 11/1999 | Scully et al. | 345/522 |
| 5,986,667 A | * | 11/1999 | Jevans | 345/619 |
| 5,990,911 A | | 11/1999 | Arrott et al. | |
| 6,434,578 B1 | * | 8/2002 | McCauley et al. | 715/210 |
| 6,466,217 B1 | * | 10/2002 | Hsieh et al. | 345/503 |
| 6,483,519 B1 | | 11/2002 | Long et al. | |
| 6,626,958 B1 | * | 9/2003 | McCauley et al. | 715/210 |
| 6,631,498 B1 | * | 10/2003 | McCauley et al. | 715/210 |
| 6,782,141 B1 | | 8/2004 | Coleman et al. | 382/291 |
| 6,791,552 B2 | * | 9/2004 | Gould et al. | 345/506 |
| 7,023,439 B2 | | 4/2006 | Martin et al. | 345/428 |
| 7,084,878 B2 | | 8/2006 | Herceg et al. | 345/555 |
| 7,191,410 B1 | * | 3/2007 | Kruempelmann et al. | 715/853 |
| 7,228,525 B2 | * | 6/2007 | Chadzelek | 717/106 |
| 7,280,995 B1 | * | 10/2007 | Sedlar | 707/1 |
| 7,328,407 B2 | * | 2/2008 | MacLaurin | 715/744 |
| 2003/0115365 A1 | * | 6/2003 | Lindsey | 709/246 |
| 2004/0143627 A1 | * | 7/2004 | Dietl | 709/203 |
| 2005/0210069 A1 | | 9/2005 | Deng et al. | 707/104.1 |
| 2006/0080269 A1 | * | 4/2006 | MacLaurin | 706/45 |

FOREIGN PATENT DOCUMENTS

AU           744091         2/2002

* cited by examiner

*Primary Examiner*—Ryan R Yang
(74) *Attorney, Agent, or Firm*—Fitzpatrick, Cella, Harper & Scinto

(57) ABSTRACT

A method of rendering a sequence of graphical objects, where two or more different renderers are available and one of the renderers is designated as a currently-used renderer, includes the steps of receiving a current object in the sequence of graphical objects, adding the current object to a set of recently-received objects, and checking whether any one of a predetermined group of patterns of objects is present in the set, each pattern having an associated indication of the suitability of the available renderers for the pattern, the suitability being dependent on a time taken to render the pattern. The method further includes the steps of determining a suitable renderer from the available renderers using a pattern and associated indication identified in the checking step, and switching from the currently-used renderer to the suitable renderer if the suitable renderer is different from the currently-used renderer.

29 Claims, 28 Drawing Sheets

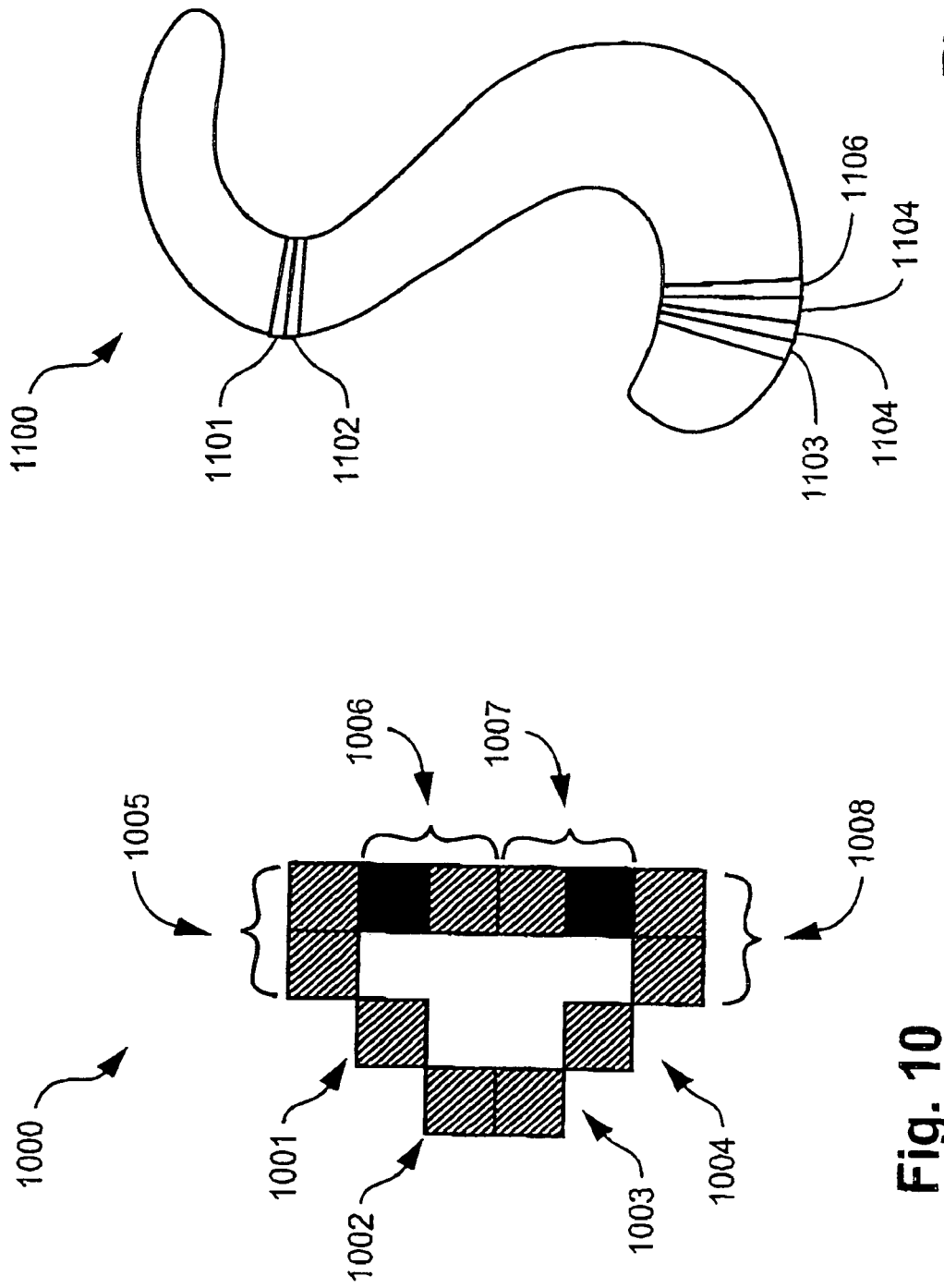

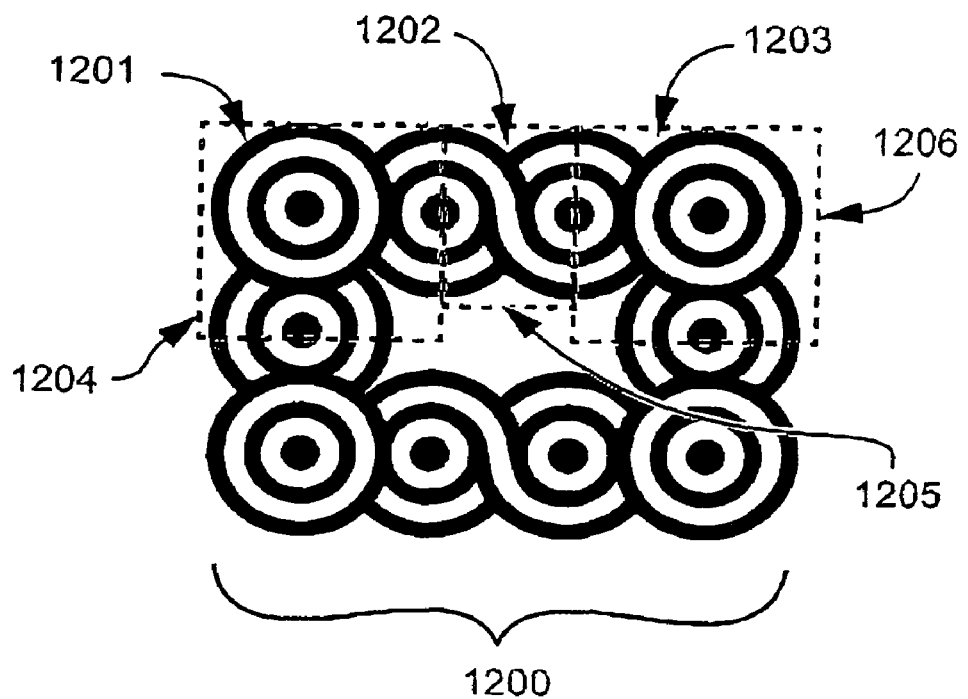
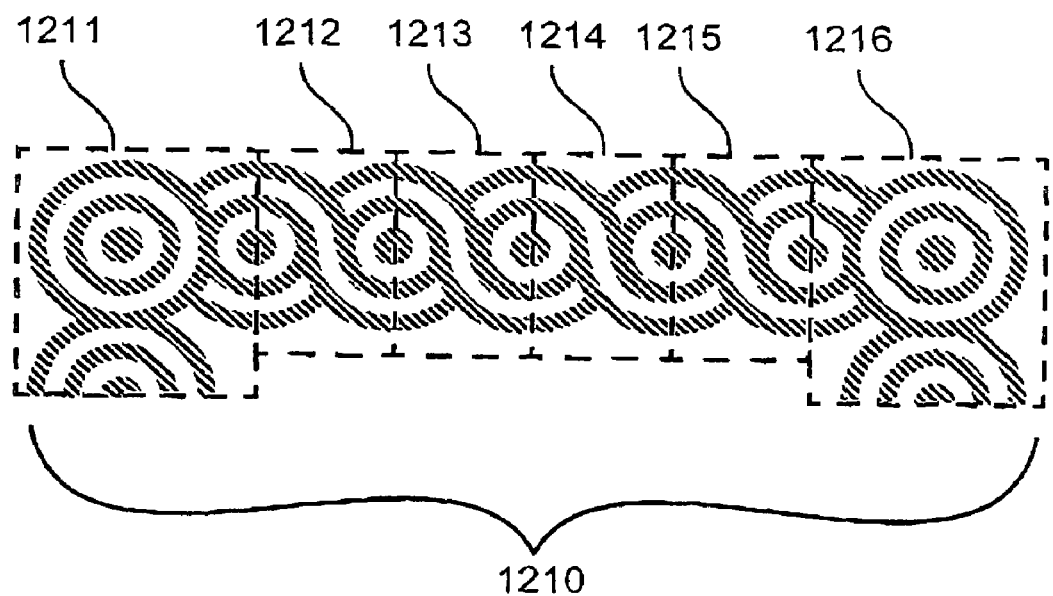
Fig. 12

| Object category | Counter for object category in last 5 objects | Counter for object category in last 10 objects | Counter for object category in last 20 objects | Counter for object category in last 30 objects | Counter for object category in last 40 objects | Counter for object category in last 60 objects | Counter for object category in last 80 objects |
|---|---|---|---|---|---|---|---|
| Large flat colour object | Yes | Yes | | | | | |
| Large blended colour object | Yes | Yes | | | | | |
| Large image (>100 pixels in x and y), arbitrary rotation | | Yes | | | | | |
| Tiny image (less than 3 pixels) | | | | Yes | | | |
| Small image | | | Yes | | Yes | Yes | Yes |

| | | | | | | | |
|---|---|---|---|---|---|---|---|
| 1616 Small shape, flat colour | | | Yes | | Yes | Yes | Yes |
| 1617 Tiny shape, n edge segments, blended colour | | | Yes | | | | |
| 1618 Small shape, blended colour | | | Yes | | Yes | Yes | Yes |
| 1619 Text character, larger than 40 pixels in x and y | | | | Yes | | | |
| 1620 Text character, <30 pixels in x or y | | | Yes | | Yes | Yes | Yes |
| 1621 Clip | | | Yes | | Yes | Yes | Yes |
| 1622 Other | | | | | | | |

DYNAMIC RENDER ALGORITHM SELECTION

CROSS-REFERENCE TO RELATED PATENT APPLICATIONS

This application claims the right of priority under 35 U.S.C. § 119 based on Australian Patent Application No 2004905560, filed 24 Sep. 2004, which is incorporated by reference herein in its entirety as if fully set forth herein.

FIELD OF INVENTION

The current invention relates to rendering graphical object descriptions for printing, storage or display, and in particular to swapping renderers while rendering graphical object descriptions for printing, storage or display.

BACKGROUND

There are many methods of converting object descriptions to pixels. All such methods are called "rendering". Object descriptions may be presented in Page Description Languages (PDLs) such as PCL, Postscript or PDF, or may be passed to the renderer via some programming interface. In any case, the renderer receives objects, usually in drawing order (also referred to as priority or z-order). The renderer then converts the received objects into pixels, which are horizontally and vertically ordered color and/or transparency values that may be used to drive a printer engine or display. The pixels may be used as an image for other purposes such as storage.

When a computer application provides data to a device for printing and/or display, an intermediate description of the page is often given to the device driver software in a page description language, such as Postscript or PCL. Such languages provide descriptions of the objects to be rendered onto the page, rather than a raster image of the page to be printed. Equivalently, a set of descriptions of graphics objects may be provided in function calls to a graphics interface, such as the GDI in the Microsoft Windows™ operating system, or the X-11 in the Unix™ operating system. The page is typically rendered for printing and/or display by an object-based graphics system (or Raster Image Processor). Additionally, the rendered output can be stored as an image, and such images may be transferred to other systems.

Most of these object-based graphics systems utilize a large area of memory, known as a framestore or a page buffer, to hold a pixel-based image of the page or screen for subsequent printing and/or display. Typically, the outlines of the graphic objects are calculated, filled and written into the framestore in sequence.

For two-dimensional graphics, objects that appear in front of other objects are simply written into the framestore after the background objects. Foreground objects thus replace the background on a pixel by pixel basis. Higher priority graphic objects take precedence because they are drawn later than those of lower priority. This is commonly known to the art as "Painter's algorithm". Objects are considered in priority order, from the rearmost object to the foremost object. The rearmost object has the lowest priority (or Z order), and the foremost object has the highest priority (Z order). Typically, each object is rasterized in scanline order and pixels are written to the framestore in sequential runs (pixel spans) along each scanline.

Some graphics interfaces allow a logical or arithmetic operation to be specified, the operation being performed between one or more graphics objects and the pixels already rendered in the framestore. In such cases, the principle remains the same in that objects (or groups of objects) are rasterized in scanline order. The result of the specified operation is calculated and written to the framestore in sequential runs along each scanline.

There are two problems with the Painter's algorithm. The first is that the technique requires fast random access to all of the pixels in the framestore. This is because each new object could affect any pixel in the framestore. For this reason, the framestore is normally kept in semiconductor random access memory (RAM). For high-resolution color printers the amount of RAM required can be very large, typically in excess of 100 Mbytes. Large amounts of RAM are relatively costly and are difficult to run at high speed. The second problem is that many pixels in the framestore are over-painted (re-rendered) by later objects, often many times. Painting these pixels with the earlier objects can result in considerable wasted computation effort and wasted memory bandwidth. The problems with the Painter's algorithm result in lower rendering performance.

One method for overcoming the large framestore problem is the use of "banding". When band rendering is used, only part of the framestore exists in memory at any one time. All of the objects to be drawn are retained in an object list by the rendering application. The object list is considered in object order as in the Painter's algorithm, but the only pixel operations performed are those which fall within the part of the page intersected by the band. After all objects in the object list have been drawn, the band is complete and can be sent to the printer (or to intermediate storage) and the process repeats for the next band on the page. With this method, the bands are rendered in order, down the page.

There are some penalties with this technique, however. It is necessary to retain in a list all objects to be drawn on the page. It may also be necessary to reconsider the objects being drawn many times, possibly once for each band. As the number of bands increases, so too does the repetitious examination of the objects being rendered. Also, the technique of banding does not solve the problem of over-painting. In some implementations, the overhead of dividing the page into bands can also result in a performance penalty.

Some other graphic systems consider the image in scanline order. Again, all of the objects on the page are retained in a list, which can be an intermediate display list. On each scanline the objects which intersect the scanline are considered in priority order. For each object, spans of pixels between the intersection points where the object edges intersect the scanline are filled in a line store. This technique overcomes the large framestore problem, but however still suffers from the over-painting problem.

Other graphic systems utilize pixel-sequential rendering to overcome both the large framestore problem and the over-painting problem. In these systems, each pixel is generated in raster order. Again, all objects to be drawn are retained in a list. On each scanline, the edges of objects which intersect that scanline, are held in increasing x-order of their intersection with the scanline. These points of intersection, or edge crossings, are considered in turn, and are used to decide whether the associated object is being 'activated' or 'deactivated' by the edge. Potentially, there are many objects contributing to a page. However, only relatively few of those objects are present ("active") on each individual pixel. A pixel-sequential renderer may keep an array of fields that tracks the activity of the objects. There is one activity field for each object painting operation that is of interest on the scanline. There is also a field to indicate operations that do not require previously generated data.

Between each pair of edges considered, the color data for each pixel which lies between the first edge and the second edge is generated by using a priority encoder on the activity flags to determine the operations required to generate the color. The method only performs the determined operations for the span of pixels between the two edges. In preparation for the next scanline, the coordinate of intersection of each edge is updated in accordance with the nature of each edge, and the edges are sorted into increasing order of intersection with that scanline. Any new edges are also merged into the list of edges.

Graphic systems which use pixel-sequential rendering have significant advantages in that there is no framestore or line store and no unnecessary over-painting. The object priorities are dealt with in constant order time by the priority encoder, rather than in order N time, where N is the number of priorities.

Australian Patent No. 744091, and counterpart U.S. Pat. No. 6,483,519, issued 19 Nov. 2002 to Long et al, disclose such a pixel-sequential rendering system. The system comprises a pixel-sequential rendering engine which is used in conjunction with driver software that receives graphical objects from an application program, a host computer system, and a downstream printer device. This system is capable of rendering graphical shapes, images and text, in color. The system operates by building and processing graphical objects (defined by edges, fills, levels and color operations), then producing color output one scanline at a time. For each scanline the engine processes each pixel in turn and considers the graphical objects that affect that pixel in order to determine the output for the pixel. The engine maintains a table of active fills (known as the fill table) and a table of active levels (known as the level table), which are used in the determination of those objects which make an active contribution to the current pixel.

However, the pixel-sequential renderer also has some problems. Object data which generates many closely-packed edge crossings, or which causes many active levels at one time, or which generates a large amount of fill table data, causes the pixel-sequential renderer to perform poorly. Sometimes generation of this type of problematic object data can be prevented during generation of the object data. But often applications produce PDLs or intermediate formats which contain problematic object data. In this case, the rendering system must accept the problematic object data, which in turn causes poor performance.

SUMMARY OF THE INVENTION

It is an object of the present invention to substantially overcome, or at least ameliorate, one or more disadvantages of existing arrangements.

According to a first aspect of the invention there is provided a method of rendering a sequence of graphical objects where two or more different renderers are available and one of the renderers is designated as a currently-used renderer, said method comprising the steps of:

receiving a current object in the sequence of graphical objects;

adding the current object to a set of recently-received objects;

checking whether any one of a predetermined group of patterns of objects is present in the set, each pattern having an associated indication of the suitability of the available renderers for the pattern, the suitability being dependent on a time taken to render the pattern;

determining a suitable renderer from the available renderers using a pattern and associated indication identified in said checking step; and switching from the currently-used renderer to the suitable renderer if the suitable renderer is different to the currently-used renderer.

According to a second aspect of the invention there is provided a method of rendering a sequence of graphical objects in an environment where two or more different renderers are available and one of the renderers is designated as a current renderer, said method comprising the steps of a) accumulating counts of different features of sequentially presented graphical objects;

b) determining, based on the counts, an appropriate renderer for rendering the sequentially presented graphical objects;

c) determining, based on the counts, an inappropriate renderer for rendering the sequentially presented graphical objects; and d) if the current renderer is determined to be inappropriate, switching to the appropriate renderer.

According to a further aspect of the invention there is provided an apparatus for rendering a sequence of graphical objects where two or more different renderers are available and one of the renderers is designated as a currently-used renderer, said apparatus comprising:

means for receiving a current object in the sequence of graphical objects;

means for adding the current object to a set of recently-received objects;

means for checking whether any one of a predetermined group of patterns of objects is present in the set, each pattern having an associated indication of the suitability of the available renderers for the pattern, the suitability being dependent on a time taken to render the pattern;

means for determining a suitable renderer from the available renderers using a pattern and associated indication identified by said checking means; and means for switching from the currently-used renderer to the suitable renderer if the suitable renderer is different to the currently-used renderer.

According to a further aspect of the invention there is provided a system for rendering a sequence of graphical objects, said system comprising:

two or more different renderers for rendering the sequence, one of the renderers being designated as a currently-used renderer;

data storage for storing a set of recently-received objects in the sequence; and a processor in communication with said data storage and said two or more renderers, said processor being adapted to:

receive a current object in the sequence of graphical objects;

add the current object to the set of recently-received objects;

check whether any one of a predetermined group of patterns of objects is present in the set, each pattern having an associated indication of the suitability of the available renderers for the pattern, the suitability being dependent on a time taken to render the pattern, determine a suitable renderer from the available renderers using a pattern and associated indication identified by said check; and switch from the currently-used renderer to the suitable renderer if the suitable renderer is different to the currently-used renderer.

According to a further aspect of the invention there is provided a computer program product comprising machine-readable program code recorded on a machine-readable recording medium, for controlling the operation of a data processing apparatus on which the program code executes to perform a method of rendering a sequence of graphical objects where two or more different renderers are available and one of the renderers is designated as a currently-used renderer, said method comprising the steps of:

receiving a current object in the sequence of graphical objects;

adding the current object to a set of recently-received objects;

checking whether any one of a predetermined group of patterns of objects is present in the set, each pattern having an associated indication of the suitability of the available renderers for the pattern, the suitability being dependent on a time taken to render the pattern;

determining a suitable renderer from the available renderers using a pattern and associated indication identified in said checking step; and switching form the currently-used renderer to the suitable renderer if the suitable renderer is different to the currently-used renderer.

BRIEF DESCRIPTION OF THE DRAWINGS

One or more embodiments of the invention will now be described with reference to the drawings, in which:

FIG. 10 illustrates an idiom made up of many tiny images;

FIG. 11 illustrates an idiom made up of many small flat color objects;

FIG. 12 illustrates an idiom made up of many tiny objects combined with ROP3 or ROP4;

FIGS. 16(a) and (b) shows a table of some classified object counters that may be used in the methods of the present disclosure;

DETAILED DESCRIPTION INCLUDING BEST MODE

Figure 1:
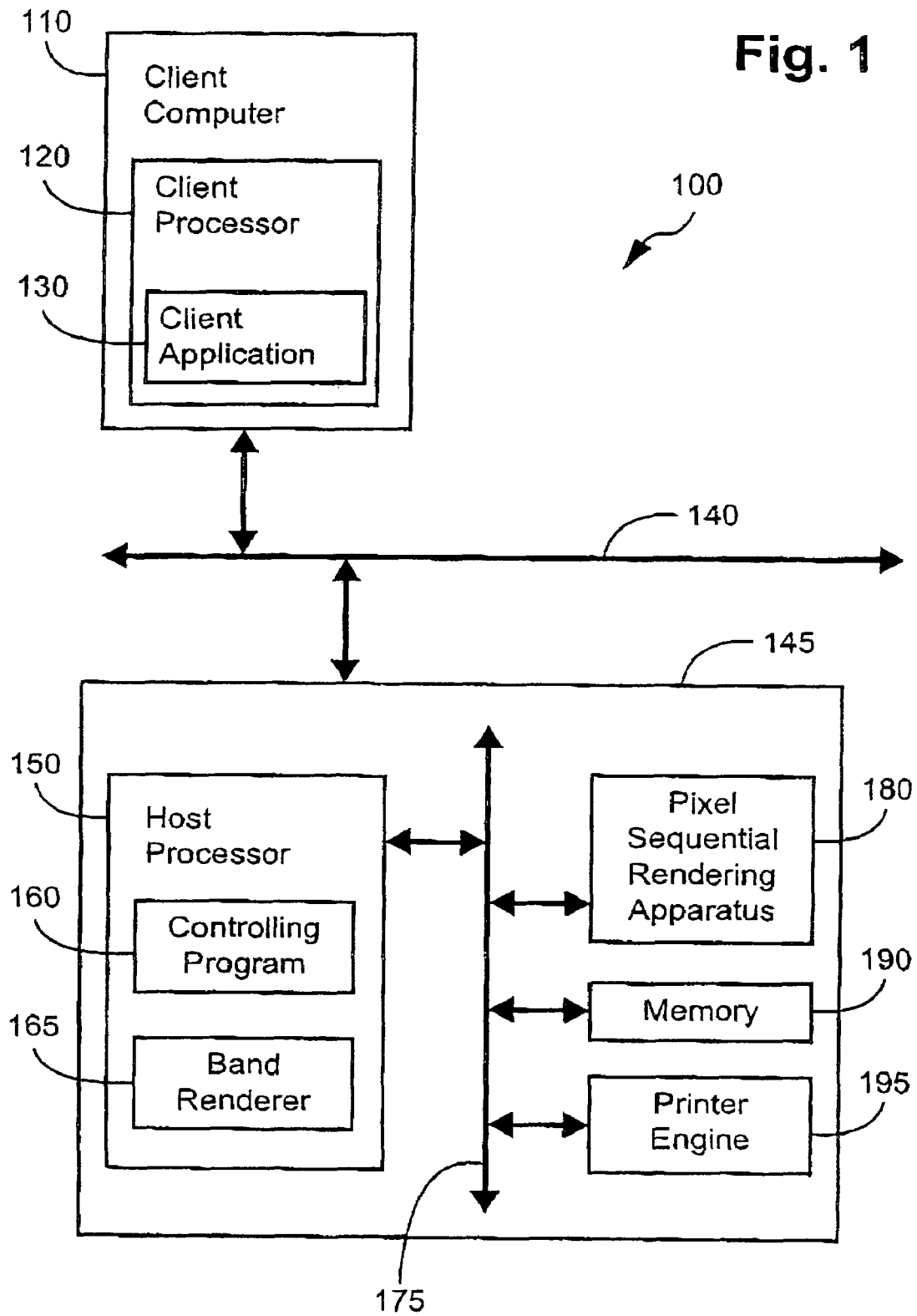
FIG. 1 is a schematic block diagram of a system on which the methods of the present disclosure may be implemented.

Some portions of the description which follows are explicitly or implicitly presented in terms of algorithms and symbolic representations of operations on data within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that the above and similar terms are to be associated with the appropriate physical quantities and are merely convenient labels applied to these quantities. Unless specifically stated otherwise, and as apparent from the following, it will be appreciated that throughout the present specification discussions utilizing terms such as "calculating", "determining", "replacing", "generating" "initializing", "outputting", or the like, refer to the action and processes of a computer system, or similar electronic device, that manipulates and transforms data represented as physical (electronic) quantities within the registers and memories of the computer system into other data similarly represented as physical quantities within the computer system memories or registers or other such information storage, transmission or display devices.

The present specification also discloses apparatus for performing the operations of the methods. Such apparatus may be specially constructed for the required purposes, or may comprise a general purpose computer or other device selectively activated or reconfigured by a computer program stored in the computer. The algorithms and displays presented herein are not inherently related to any particular computer or other apparatus. Various general purpose machines may be used with programs in accordance with the teachings herein. Alternatively, the construction of more specialized apparatus to perform the required method steps may be appropriate.

In addition, the present invention also implicitly discloses a computer program, in that it would be apparent to the person skilled in the art that the individual steps of the preferred method described herein are to be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing the spirit or scope of the invention. Furthermore one or more of the steps of the computer program may be performed in parallel rather than sequentially.

Such a computer program may be stored on any computer readable medium. The computer readable medium may include storage devices such as magnetic or optical disks, memory chips, or other storage devices suitable for interfacing with a general purpose computer. The computer readable medium may also include a hard-wired medium such as exemplified in the Internet system, or wireless medium such as exemplified in the GSM mobile telephone system. The computer program when loaded and executed on a general-purpose computer effectively results in an apparatus that implements the steps of the preferred method.

Where reference is made in any one or more of the accompanying drawings to steps and/or features, which have the same reference numerals, those steps and/or features have for the purposes of this description the same function(s) or operation(s), unless the contrary intention appears.

FIG. 1 shows a rendering system on which the methods of the present disclosure may be implemented. The rendering system 100 includes a client computer 110 and a printing system 145. The client personal computer 110 has a client processor 120 for executing a client software application 130, such as a word processor or graphical software application. The application 130 creates page-based documents where each page contains objects such as text, lines, fill regions, and image data. The software application 130 preferably sends a page for printing in the form of an application job.

The application job is forwarded via network 140 to the printing system 145. The network may be a typical network to which multiple client personal computers are connected, or the network may be a simple connection between a single personal computer and host printing system 145.

The host printing system 145 comprises a host processor 150, memory 190, a pixel sequential rendering engine 180, and a printer engine 195, coupled via a bus 175. The rendering engine 180 is preferably in the form of an ASIC card coupled via the bus 175 to the host processor 150. However, the rendering engine 180 may also be implemented in software.

The host processor 150 includes a controlling program 160 and a band renderer 165 implemented in software. The controlling program 160 receives graphical objects from the application program 130, and constructs an instruction job understood by the rendering apparatus 180 or the band renderer 165. Preferably, the client application 130 provides data to the controlling program 160 by calling sub-routines in the GDI layer which provide descriptions of the objects to be rendered onto the page in the form of a Page Description Language script, rather than a raster image to be printed.

The host controlling program 160 tells the rendering engine 180 the location in memory 190 of the job to be rendered, and instructs the rendering apparatus 180 or the band renderer 165 to start rendering, whereupon the apparatus 180 or band renderer 165 interprets the instructions and data in the job, and renders the page. The output of the rendering apparatus 180 and the band renderer 165 is color pixel data, which can be used by the output stage of the printer engine 195.

When the pixel-sequential rendering apparatus 180 renders the job, for each pixel the contributing objects are determined and the resulting color is calculated. Redundant operations are eliminated because only contributing objects are used. The contributing objects remain the same between the edges of objects, so this determination is only made on an edge-by-edge basis.

In an alternative arrangement, the Printer Engine 195 can be replaced by a display device, that is the output of the rendering process is displayed for example on a computer screen. Furthermore, the output of the rendering process may be stored to a file, or output to memory for use by another program. In other arrangements, the system 145 does not have a central bus 175 and the rendering apparatus 180 may output directly to the printer engine 195. The band renderer 165 may access the print engine 195 via a separate bus to improve the available bandwidth. The system 145 is illustrated with two renders 180, 165. However, the system may be implemented with more renderers, or a framestore renderer may be used instead of the band renderer 165. The system 145 requires sufficient memory to support a full bit-depth bandstore or framestore.

As described in more detail below, the controlling program 160 may switch between different renderers in the course of processing a job.

The methods described below may also be implemented entirely in software. In this case all the method steps may be performed on a conventional computing device such as IBM™ PC type personal computers and arrangements evolved therefrom, SUN SPARCSTATIONS™ and the like. Although the implementation is described primarily in terms of a printing system, the present disclosure is applicable to any system that requires a renderer.

There are some types and combinations of objects for which a pixel-sequential renderer performs worse than framestore or band renderers. This situation arises, for example, where objects have a high density of edges, or the space taken by fill definitions is large (e.g. many blended objects). Further examples include large arbitrarily-rotated images, or cases in which there are multiple images whose color contributes to a set of pixels. Other sequences or types of objects may also cause a pixel-sequential renderer to perform poorly.

On the other hand, there are also sequences of objects which cause a framestore renderer (or band renderer) to perform poorly. For example, large numbers of overlapping objects, especially where opaque objects obscure other objects below, cause a framestore renderer to perform poorly compared to a pixel-sequential renderer.

Such types of objects and sequences of objects can be identified. In the following description, these types of objects and object sequences are referred to as idioms, because they have certain idiomatic properties that can be recognized. The process of determining if objects or sequences of objects do in fact conform to the idiom is known as idiom recognition. A technique of idiom recognition is described below.

Idiom recognition may be used to instigate a switch to a different style of renderer that would handle the objects or object sequences more efficiently. Depending on the recognized idiom, the most suitable render mechanism for the considered objects or object sequences can be chosen.

In one arrangement, switching takes place between the pixel-sequential renderer 180 and the band renderer 165. However, using the technique described below, it is possible to use any combination of renderers and to switch to the most appropriate renderer available. Possible renderer types include, among many others, pixel, scanline, framestore, compressed, tiled framestore; band, bucket, hardware and software renderers. For each renderer type, it is possible to detect objects and/or sequences of objects which cause that type of renderer to perform poorly. It is also possible to determine in which renderer type an object or sequence of objects would perform best. Such determination enables the controlling program 160 to switch to the most appropriate renderer.

Display Lists

Switching renderers can introduce a high overhead to the system. The efficiency of switching between renderers is partially dependent on the display list compatibility between the renderers.

While some renderers do not require a display list, many renderers use display lists, which may be in any one of a variety of formats. For example, a pixel-sequential renderer in general requires a display list sorted in y and x order, where the y-axis indicates increasing scanlines and the x-axis indicates position along a scanline. However, a pixel-sequential renderer may accept a Z-ordered display list. In this case, the sorting into y order and then x order is done after the display list is presented to the renderer. These two options are illustrated in FIGS. 2A and 2B.

Figure 2A:
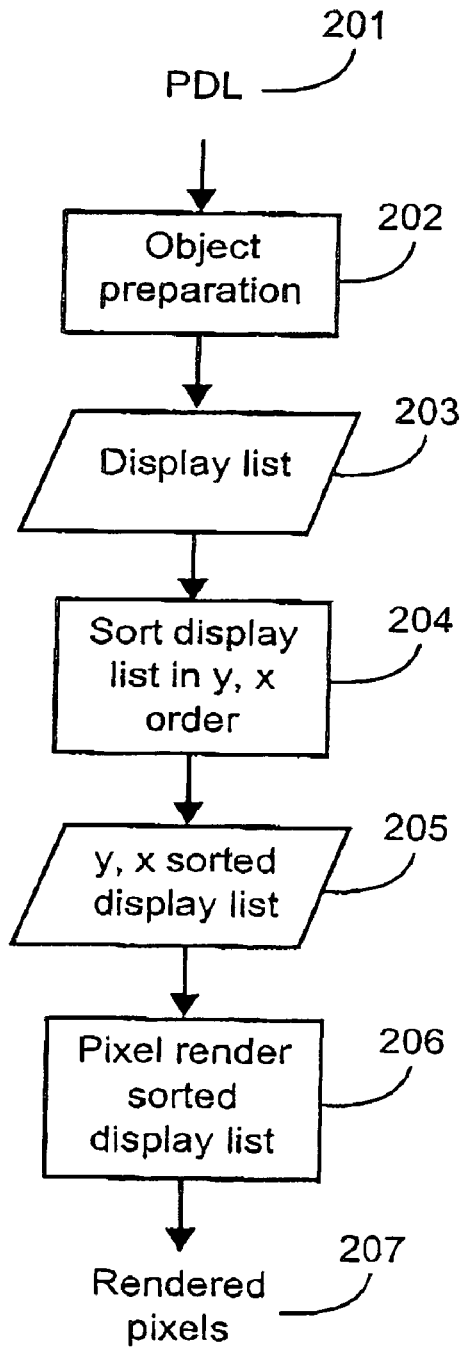
FIGS. 2A and 2B show flow diagrams illustrating the use of display lists with a pixel-sequential renderer.
Figure 2B:
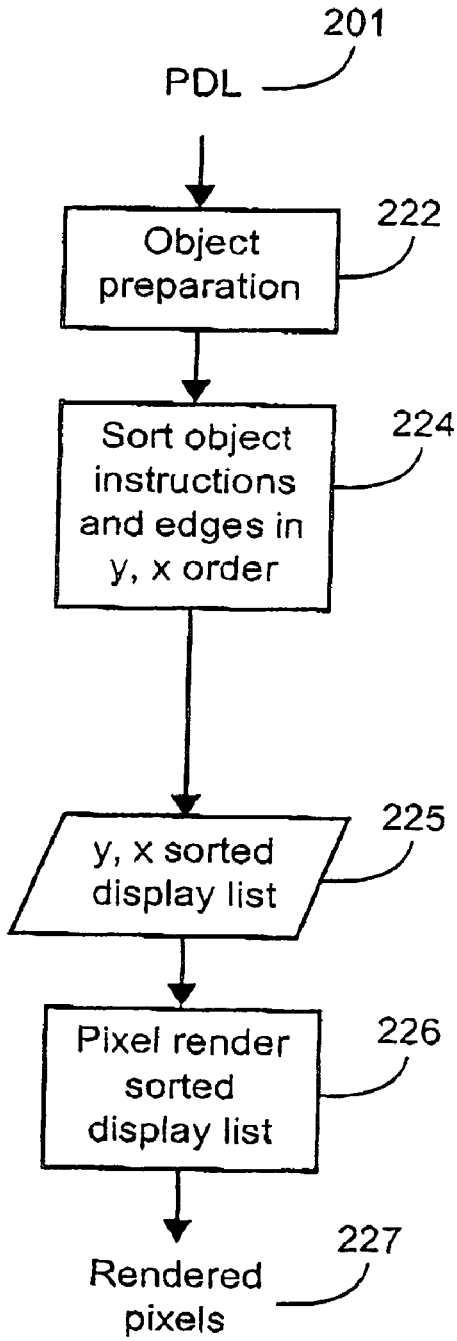

In FIG. 2A, a PDL script 201 is received by a rendering system using a pixel-sequential renderer. Although the description refers to a PDL script 201 as the input, the object descriptions may come from a PDL, such as Postscript, or from graphics library calls, or from display or printer specific graphics drawing calls, such as Microsoft's GDI™. The incoming data consists of objects, generally (but not necessarily always) presented in drawing order (Z order).

For the purpose of this description straight or simple curves (such as a single cubic or quadratic Bezier curve segment) are called edge segments. Edge segments joined into a larger closed or open sequence form an edge. In a closed sequence the start of the sequence joins the end. Multiple edges combine to form paths (for example, a 2D representation of a doughnut needs two edges to form its path description). A path together with associated fill information (for example, the color red, or image pixels) is referred to as a shape.

The incoming objects are prepared in step 202. Such object preparation involves reading path data in user coordinates and transforming the path data into device coordinates, converting edges into a format suitable for rendering, decompressing image data which is in a format not supported by the renderer, and many other possible steps known to those skilled in the art.

After preparation, the prepared object is entered into the display list 203. To be suitable for pixel rendering, the display list 203, in which objects are presented in drawing order, needs to be sorted into scanline and pixel order (y, x order). This sorting is done in step 204, which produces a y, x sorted display list 205. This sorted display list 205 is then rendered in step 206 by a pixel sequential apparatus lo produce the rendered pixels 207.

In a system that only uses pixel-sequential rendering, there is no need to store the Z-ordered display list 203. A system such as this is described in FIG. 2B, in which the input PDL script 201 undergoes object preparation in step 222 as previously described with respect to step 202. Then, in step 224, the object instructions, edges and other embedded data are sorted in y, x order immediately. A y, x sorted display list 225 is produced directly, with no necessity for the intermediate stage of a Z ordered display list. The y, x sorted display list 225 is then pixel rendered in step 226 by a pixel-sequential renderer, producing the rendered pixels 227.

In conventional systems, a display list is a list of objects in a format which can be directly rendered. However, it can be seen from the above explanation that a display list is a flexible data structure that can be defined to be the input format for the renderer, where that format is most suitable for the overall system. In the methods of the present disclosure, which switch between different renderers, it is preferable to use a consistent display list preparation.

Figure 3A:
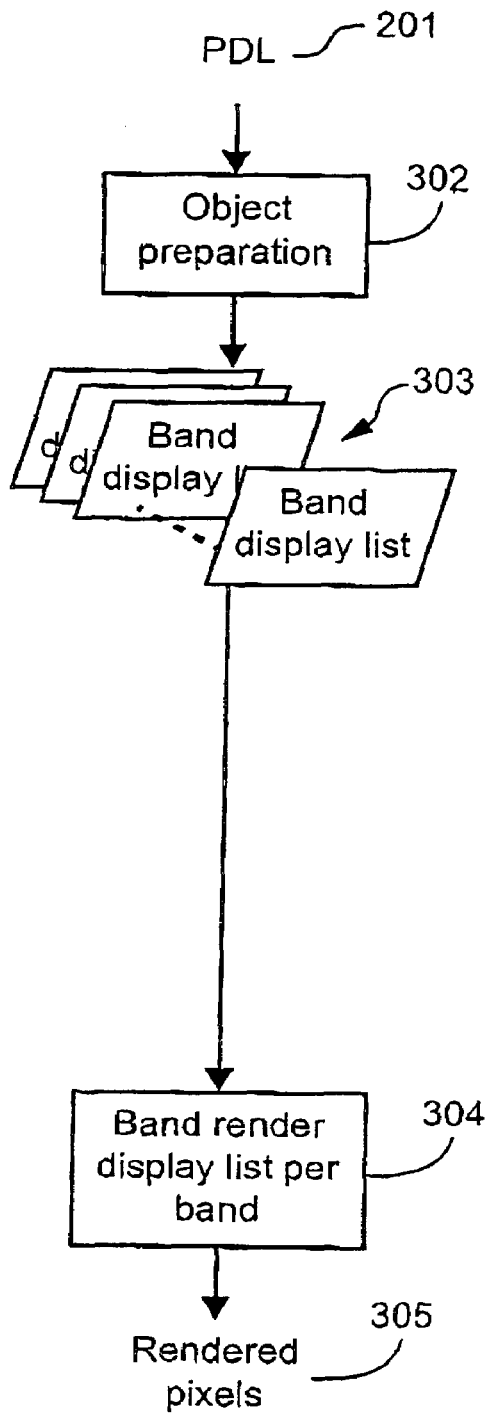
FIGS. 3A and 3B show flow diagrams illustrating the use of different display list definitions for a pixel-sequential renderer and a band renderer.
Figure 3B:
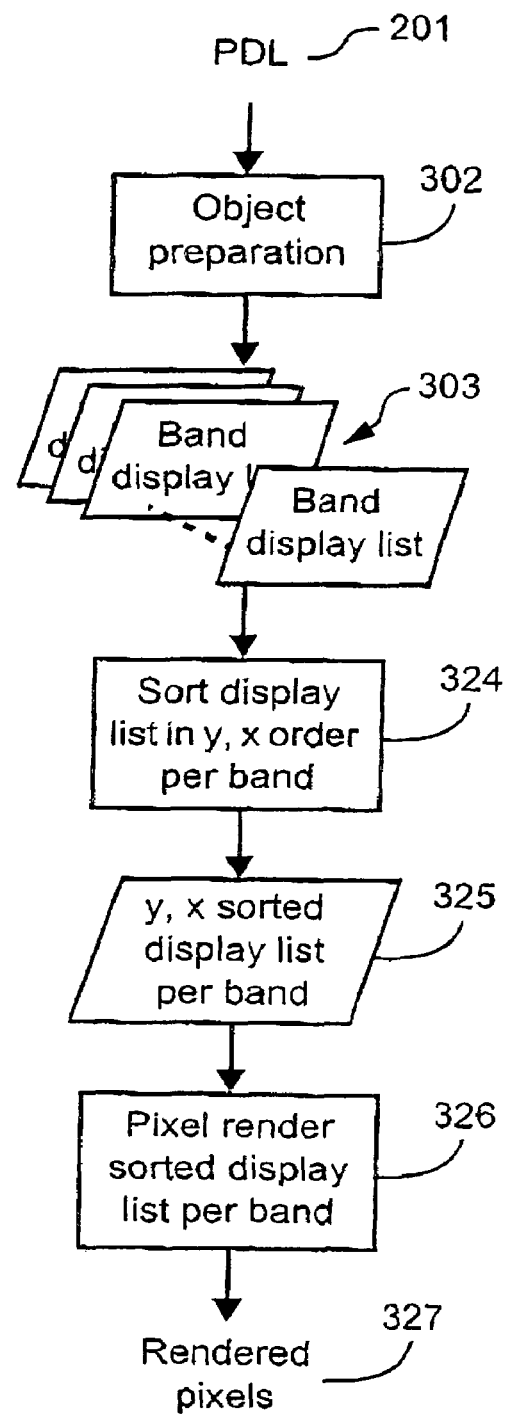

FIGS. 3A and 3B are schematic representations of the display list preparation performed by printing system 145 using, respectively, the band renderer 165 and the pixel-sequential renderer 180. In each case, the page is processed in bands, with each band having a separate display list.

In FIG. 3A, objects are split into multiple display lists, one display list per band. As before, the input is a PDL script 201. In step 302 the controlling program 160 prepares the objects, and analyses each object to see which bands the object spans. The object is then added to the appropriate display lists, resulting in one display list per band. When the band display lists 303 are complete, the bands are rendered in step 304 by band renderer 165, producing rendered pixels 305. The printing system requires sufficient memory to support a bandstore holding all the pixels for the band at full bit depth.

In FIG. 3B, the controlling program 160 receives the PDL script 201 and performs the same object preparation 302 to produce one display list per band. These band display lists 303 are in the same format as used for the band renderer 165. However, in order to render the objects using the pixel-sequential renderer 180, the controlling program 160 sorts the band display lists 303 into y, x order. This is done individually per band in step 324 by the controlling program 160, producing a y, x sorted display list 325. For each band, this sorted display list 325 is pixel rendered in step 326 by the pixel-sequential rendering apparatus 180, producing rendered pixels 327.

In the situation where switching takes place between renderers, it is advantageous for all renderers to support the same display list. This will be explained further below with reference to FIG. 6.

In some cases, however, a renderer might not need to have a display list at all. This is the situation with a framestore renderer. A framestore renderer requires sufficient memory to hold all the pixel data at full bit depth for a page which will eventually be sent to the printer. The framestore pixels are initialized to the background color of the paper (white). As objects are received, they are rendered immediately, and the pixels affected by the object are painted. Thus, objects do not need to be stored.

Figure 4:
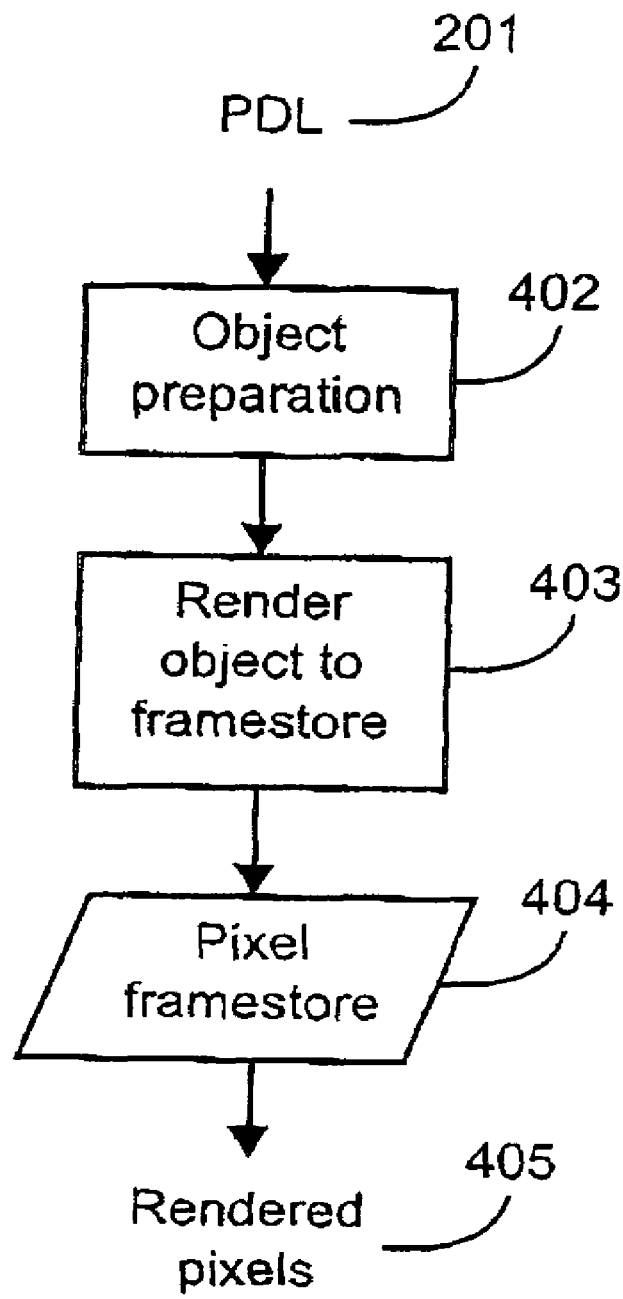
FIG. 4 shows a flow diagram of a rendering process using a framestore renderer.

Rendering using a framestore is shown in FIG. 4. Such rendering may be implemented in the system of FIG. 1, with a framestore renderer replacing the band renderer 165. The printing system then requires sufficient memory to support the framestore. As before, the controlling program 160 receives a PDL script 201 and performs object preparation in step 402. In stop 403, the framestore renderer renders objects to the pixel framestore 404. After all objects have been received from the PDL and rendered to the framestore 404, the framestore pixels are delivered as rendered pixels 405 to the printer engine 195. The rendered pixels can alternatively be sent to a display, other device, or file, be stored in memory or be transmitted across a network.

First Arrangement: Switching Between Pixel-Sequential and Framestore Renderers

Figure 5:
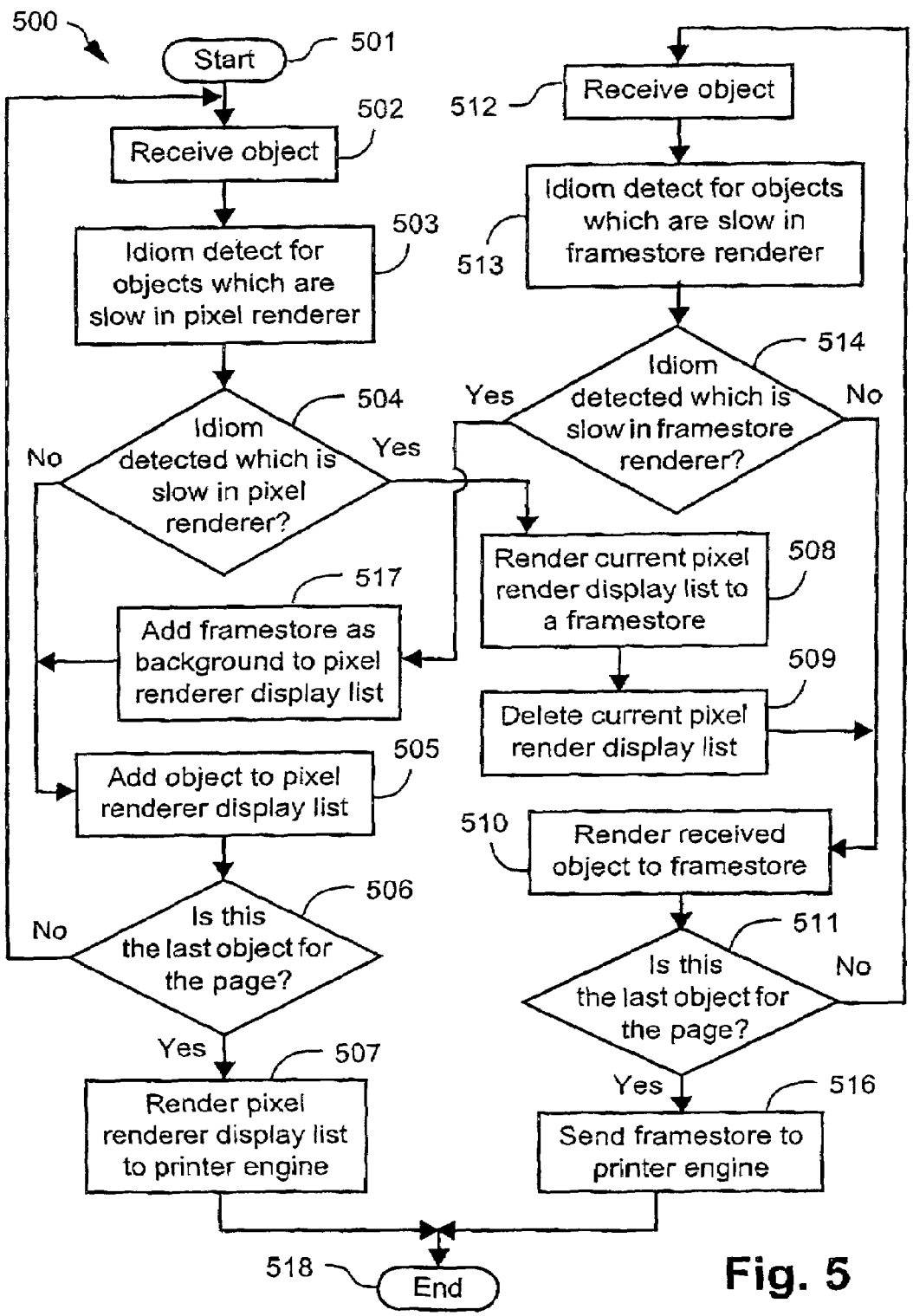
FIG. 5 shows a flowchart of a method which switches between a pixel-sequential renderer and a framestore renderer.

A flowchart 500 of an arrangement in which switching occurs between a pixel-sequential renderer and a framestore renderer is shown in FIG. 5. In this system, the pixel-sequential renderer uses a display list but the framestore renderer renders each object directly to the framestore, and hence does not keep a display list. Such an arrangement may be implemented using the system of FIG. 1 in which the software renderer 165 is a framestore renderer.

In process 500 the printing system 145 renders a series of incoming graphical objects, such as text, images or graphical drawings, to a pixel stream received by printer engine 195. The default renderer is pixel-sequential renderer 180.

The process 500 starts in step 501. The controlling program 160 receives objects in drawing order (Z order), with the objects furthest from view being received first. In step 502, the controlling program receives the next object for consideration. In step 503 the program 160 applies idiom recognition to the received object, combined with a record of the pattern of objects previously received. The technique of idiom recognition is further explained later with reference to FIG. 17.

Step 504 checks whether an idiom is detected which would cause poor performance in the pixel-sequential renderer 180. If no such idiom is detected (the NO option of step 504), then in step 505 the received object is added to the display list. Then, in step 506, the controlling program 160 checks whether the current object is the last object on the page. If there are further objects (the NO option of step 506) the program 160 returns to step 502 to receive the next object. If, however, the current object is the last object (the YES option of step 506) then the display list is transferred to the pixel-sequential rendering apparatus 180, which in step 507 renders the display list and provides pixels to the printer engine 195. The method 500 then ends in step 518.

If an idiom is detected which is slow in a pixel-sequential renderer (the YES option of step 504), then the controlling program 160 proceeds to step 508 and initiates a witch to the framestore renderer 165. In step 508 the controlling program 160 transfers the display list to framestore renderer 165, which renders all objects in the display list to the framestore. Note that the currently-received object has not yet bean added to the display list. Next, in step 509, the controlling program 160 deletes the display list and in step 510, provides the currently-received object to the framestore renderer 165 to render to the framestore.

Then, in step 511, the controlling program 160 checks whether the current object is the last object for the page. If so (the YES option of step 511), in step 516 the program 160 sends the contents of the framestore to the printer engine 195 and the method 500 ends in step 518. If there are further objects on the page (the NO option of step 511), then method 500 proceeds to step 512, in which the controlling program 160 receives the next object. Note that the default renderer is currently the framestore renderer 165.

In step 513 the controlling program 160 performs idiom detection for idioms which cause slow operation of the framestore renderer 165. Step 514 checks whether such idioms have been detected. If no idioms are detected that are slow in the framestore renderer (the NO option of step 514) then the controlling program 160 proceeds to step 510 to process the object using the framestore renderer.

If, however, an idiom is detected which is slow in the framestore renderer (the YES option of step 514), then program 160 proceeds to step 517 to initiate a switch back to the pixel-sequential renderer 180. In step 517 the program 160 adds the contents of the framestore as the first object (background) of the display list. Process flow then proceeds to step 505, which adds the current object to the display list and continues processing with the pixel-sequential renderer 180 as the current renderer.

The display list rendered holds all the previous objects received, possibly including ones which contributed to the detected idiom that caused the switch to occur. Only the most recent object received is passed to the alternate renderer. It would be possible in another implementation to store a number of recently received objects, and to pass all the stored objects to an alternate renderer if the stored objects contribute to an idiom, detection of which causes a switch to happen.

Idioms are recognized on the basis that applications produce characteristic patterns of objects, and once begun, the pattern can be continued for a great many objects. The described switch between renderers takes place on the assumption that the pattern of objects detected will continue for long enough that the overhead of switching will be more than compensated for by the performance improvement obtained for subsequent objects.

Sometimes, the switch will take place when only one object is received, such as a large image rotated at an angle which is substantially different to zero degrees, or multiples of 360 degrees. Thus, in the present disclosure, a 'pattern' may consist of a single object.

There is overhead associated with switching renderers, so there is no point in switching unless another renderer will have a significant advantage over the current renderer. So idioms are detected for objects and object patterns or sequences which male the current renderer perform poorly compared to other available renderer(s).

Second Arrangement: Switching Between Pixel-Sequential and Band Renderers

In a second arrangement, switching takes place between the pixel-sequential renderer 180 and the band renderer 165. The operation of switching takes place on a band basis only. That is, only bands affected by objects for which idioms are detected are switched. This is more complex than switching the entire framestore. However, it is more efficient to only switch affected bands, as there is less overhead involved, and rendering can continue for bands independently using the most efficient renderer for the band.

In the second arrangement, the band renderer 165 accepts the same display list as the pixel-sequential renderer 180. Therefore, it is possible to just pass the display list for a band to a different renderer, if idioms are detected for objects which are already included in tho display list. This gives more efficient system operation.

The operation of the second arrangement will now be described with reference to FIG. 6, in which process 600 renders a page using a banding mechanism.

The process 600 starts in step 601. In step 602 the controlling program 160 receives a prepared object to draw on the page. Originally, the object data could come from a PDL interpreter, graphics API, or some similar source. The object data is prepared using object preparation as described with reference to step 302. For rendering purposes, the page is split into multiple horizontal bands. The bands are aligned with scanlines that will be produced for the render engine. A received object might be either wholly contained within a band, or it might span multiple bands.

In step 603, the controlling program 160 determines the next band that contains the object. The next band is found by looking at the extents of the object. The top-most band that the object intersects is dealt with first. Subsequent bands further down the page which also intersect the object are dealt with later. The band currently being examined is called the current band. The default renderer for the band is the band renderer.

In step 604, a check is made as to whether the current band is assigned to be band rendered. The renderer to which the current band is assigned is called the current renderer. If the current renderer is a band renderer (the YES option of step 604), then process 700 is executed with the current renderer set to be a band renderer. Process 700 is described in more detail with respect to FIG. 7.

If the current band is not being band rendered (the NO option of step 604), the controlling program 160 proceeds to step 605 to check whether the current renderer is pixel-sequential renderer 180. If it is (the YES option of step 605), process 700 is executed with the current renderer set to be a pixel-sequential renderer.

Figure 6:
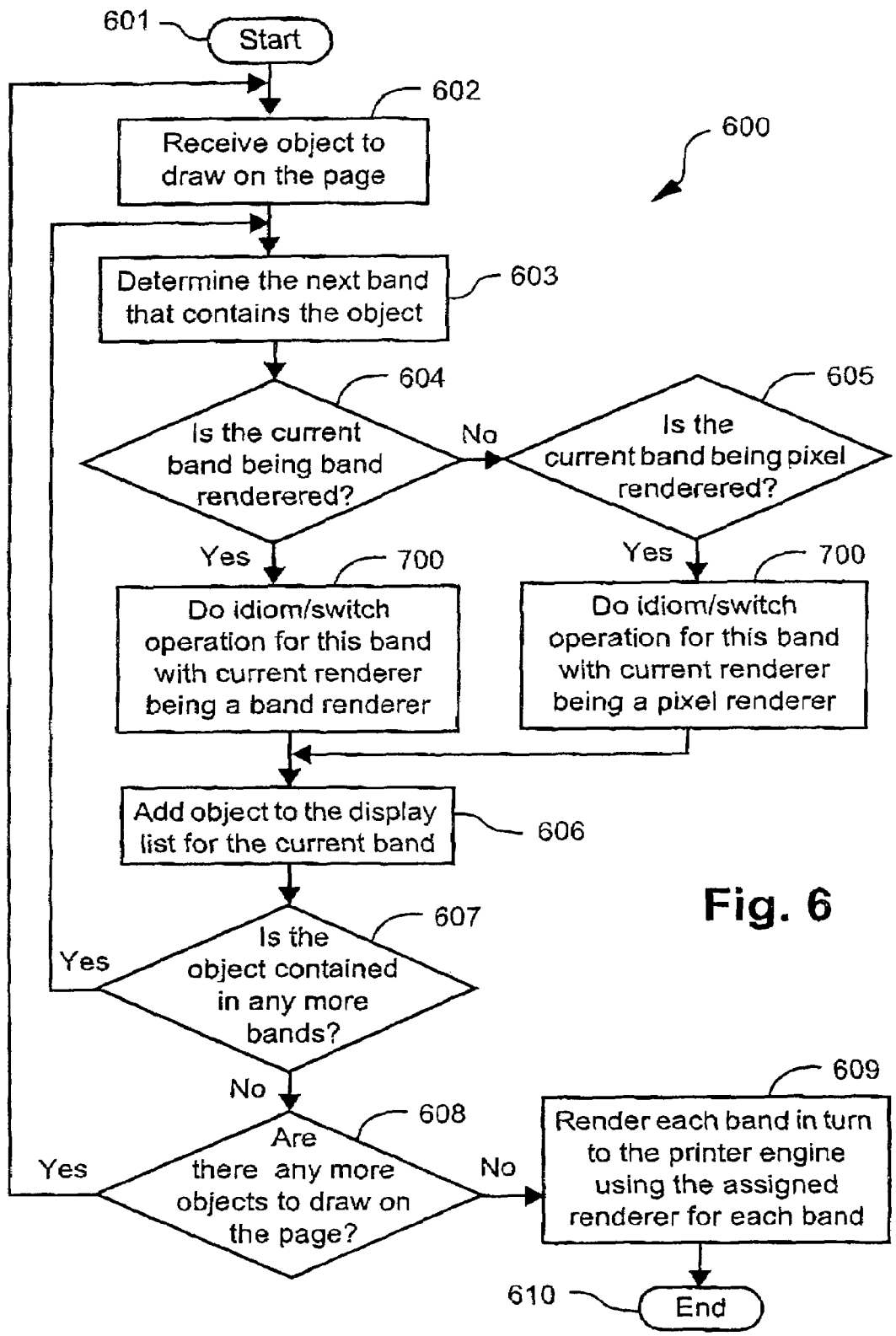
FIG. 6 shows a flowchart of a method which switches between a band renderer and a pixel-sequential renderer.

As seen in FIG. 6, step 605 is redundant as switching only takes place between two renderers. However, any number of renderers may be used. Where further renderers are available, the NO option of step 605 proceeds to further checks, similar to steps 604 and 605, as to whether a further renderer is the current renderer. If so, the process 700 is executed for that further renderer. As will be shown later, the process 700 can also effect a switch to any one of multiple renderers.

When the process 700 returns, in step 606 the controlling program 160 adds the object received in step 602 to the display list for the current band. Objects can span multiple bands. That is, many bands can contain one object. One copy of the object data is kept, and a reference is made to the single copy from all bands containing that object, In step 607, the program 160 checks to see if the object received in step 602 is contained in any more bands. If it is (the YES option of step 607), the program 160 returns to step 603 to process the object in the next band. If the object is not contained in any more bands (the NO option of step 607), then the processing of this object is complete. In step 608, a check is made to see if there are any more objects to draw on the page. If so (the YES option of step 608), the controlling program 160 returns to step 602 and receives the next object. If there are no more objects (the NO option of step 608), the page can be rendered. In step 609, rendering of the page takes place. The controlling program 160 processes each band in turn, starting at the top and working down, passing the display list for the band to the band's assigned renderer. The pixels output by the renderers are delivered to the printer engine 195.

As described above, a single copy of the object data is stored, and is referenced by all bands using the object. Alternatively, it would be possible to process the object outline information so that objects are split between bands and hence do not span multiple bands. Edge information for each object is then kept for each band. In this alternative, the display list per band holds the object edge information for that band. The level information is also held in the display list per band, because the amount of data is small. The level information records the Z order of the object on the whole page. However, fill data is stored only once, and referenced from the display list, unless it is small (as are flat colors). In particular, image fill data is stored only once and referenced from the display list.

In this alternative where objects are split, it is possible to hold the level information for an object on a band basis. That is, the display list information for the object identifies the level of the object in the band, not the level of the object on the whole page. This alternative can only be used if the band span is defined beforehand and is not changed.

In another alternative, it is possible to split the fill data so that there is dedicated fill data per band. In this case image data needs to be pre-processed so that the correct image pixels are accessible for each band, but there is minimal duplication of image data between multiple instances of the same object. This reduces unnecessary memory usage.

The described techniques are equally applicable to rendering to any device or file that requires pixel data. For example, the same techniques can be used to render to a display, or to render pixel data to a file, or any other output device, file or in-memory image which requires rendered pixel data.

Also, although the described arrangements render a page, the same technique could be used to produce any graphical picture. For example, a rendered image containing a transparency channel could be produced. The renderers 180, 165 support transparency compositing and many different types of raster operations, and it is easy for the renderers 180, 165 to produce pixel data which contains transparency information.

The process 700 of idiom detection and renderer assignment will now be explained in more detail with reference to FIG. 7. The controlling program 160 calls process 700 from step 604 or 605 (or further equivalent steps if more than two renderers are used). Process 700 starts in step 701. In step 702, idiom detection takes place. The idioms are detected on a band basis. Idioms are detected for objects and/or sequences or patterns of objects in the current band which cause the current renderer to perform particularly poorly, or perform particularly well. This process is further described later in reference to FIG. 17. The suitability of a renderer for a particular idiom is based on the time taken to for the renderer to render the idiom.

In step 703, controlling program 160 tests whether an idiom has been detected which causes poor performance in the current renderer. If such an idiom has not been found (the NO option of step 703), then in step 704 the controlling program 160 tests whether an idiom has been detected for which the current renderer performs particularly well. If such an idiom is found (the YES option of step 704), then the NeedRender flag is set for the current band in step 705. This flag is required because even if a renderer switch is later needed, the current display list should be rendered with the current renderer as the current display list and current renderer are particularly well suited. In an alternative, the NeedRender flat may contain more information. For example, if an idiom is detected that is treated efficiently by the current renderer, but is particularly bad in a third renderer, then the render should only be done prior to switching if switching to the third renderer. That is, if any renderer is acceptable, then rendering is delayed as long as possible. However, if other renderers are poor for the identified idiom, then rendering should occur before switching. It is possible to encode state switching information into the NeedRender mechanism. Of course, in this alternate arrangement NeedRender is no longer a Boolean value, but instead contains a table of state switching instructions.

If no idiom is detected which is fast in the current renderer (the NO option of step 704), the process 700 completes in step 714. After step 705, the process 700 also completes.

Returning now to step 703, if an idiom is detected which would cause the current renderer to perform poorly (the YES option of step 703), the process 700 proceeds to step 706. In step 706, the controlling program 160 determines the most appropriate renderer for the detected idiom. This may be done using information returned with the detected idiom, as described in more detail below with reference to FIG. 17.

In the next step 707, a check is made as to whether the renderer determined in step 706 is different to the current renderer. If not (the NO option of step 707), process 700 terminates in step 714 and control returns to step 606. It is possible that some idioms will cause all available renderers to perform poorly. In such a case, even if the idiom would cause the current renderer to perform poorly, the current renderer might still be the fastest available. In this case, the process 700 completes in step 714.

If the best renderer is different to the current renderer (the YES option of step 707), then in step 708 the controlling program 160 tests whether the NeedRender flag is set for the band. If so (the YES option of step 708), in step 709 the controlling program 160 assigns the band to the current renderer, which renders the band to a bandstore. Step 709 adds the rendered bandstore as a background image to start a new display list (as for step 517). Step 709 also deletes the previous display list (as in step 509 of FIG. 5). Process 700 then proceeds to step 710.

If the NeedRender flag is not set (the NO option of step 708), the process 700 skips the rendering stage and sets the NeedRender flag in step 711. This is done because a switch is about to be made to a new renderer, and the objects collected previously are still in the display list. It is likely that objects which caused the idiom to be recognized are still in the display list and should thus be rendered by the new renderer, so the NeedRender flag is set in step 711. After step 711 control flow proceeds to step 713. The NeedRender flag is toggled whenever there is a switch of renderer., i.e. the NeedRender flag alternates between 'set' and 'not set' for each switch. An exception to this toggling is when a single object triggers an idiom.

In step 710, a test is made Lo see if the most recent object that was received in step 602 constitutes an idiom in its own right. This object has not yet been added to the display list. So if the current received object should be rendered with the new renderer (i.e. the YES option of step 710), process flow proceeds to step 711, where the NeedRender flag is set.

Otherwise (i.e. the NO option of step 710), the NeedRender flag is cleared in step 712. The process then continues to step 713, where the, controlling program 160 assigns the best renderer identified in step 706 to be the current renderer for the current band. The process 700 then completes in step 714 and process flow returns to step 606.

Preferably, the rendered band is compressed to reduce memory. However, if sufficient memory is available in the printing system 145, the band could be kept uncompressed.

All renderers in the described arrangement accept the same display list format. This means that there is less overhead in switching between renderers. It is possible to bypass step 709, and still have correct-looking output at the final render. That is, renderers can be switched without rendering the display list. Thus it is possible to switch renderers bypassing step 709, and then render the entire display list for a band with the last assigned renderer for the band in step 609.

Alternatively, the available renderers may accept different display list formats, or have no display list at all but require immediate direct rendering to a bandstore or framestore. In these cases, if a display list is present, rendering must take place upon switching bands. That is, step 709 cannot be bypassed. The display list built up for the current band must be rendered before a new renderer is assigned for the band, as the display lists for the different renderers may be incompatible.

In a further alternative, tiles could be used instead of bands. That is, the bands could be divided into sections vertically as well as horizontally, producing blocks or tiles instead of bands. The technique of FIGS. 6 and 7 applies equally well to a tile renderer combined with a pixel-sequential renderer. The display lists are built on a tile basis and the renderer swap takes place on a the basis instead of a band basis.

Many different combinations of renderers and switching algorithms are possible using the technique described. The combinations include switching between framestore and pixel renderers, switching between band and pixel renderers with a common display list, switching between band and the renderers with a common display list, switching where the display lists are different, switching where there is a mixture of display lists, and switching where there are no display lists.

The switching technique supports multiple different renderers with different characteristics. Some renderers may accept similar display lists, some renderers may have different display lists, and some may have no display lists. Some renderers may be implemented in software and some may be implemented in hardware. However all renderers have characteristic disadvantages. Detection of objects and sequences of objects which manifest those disadvantages will invoke a switch to the renderer which performs best with the object or sequence of objects detected.

Another reason for switching renderers arises if there is some missing functionality in one of the renderers. In this case, part of the idiom detection process is to check if the renderer can handle the object or the combination of objects presented. If the current renderer cannot handle the object or object combination, the renderer switch is triggered In this way, deficiencies in a renderer can be worked around efficiently.

Figure 7:
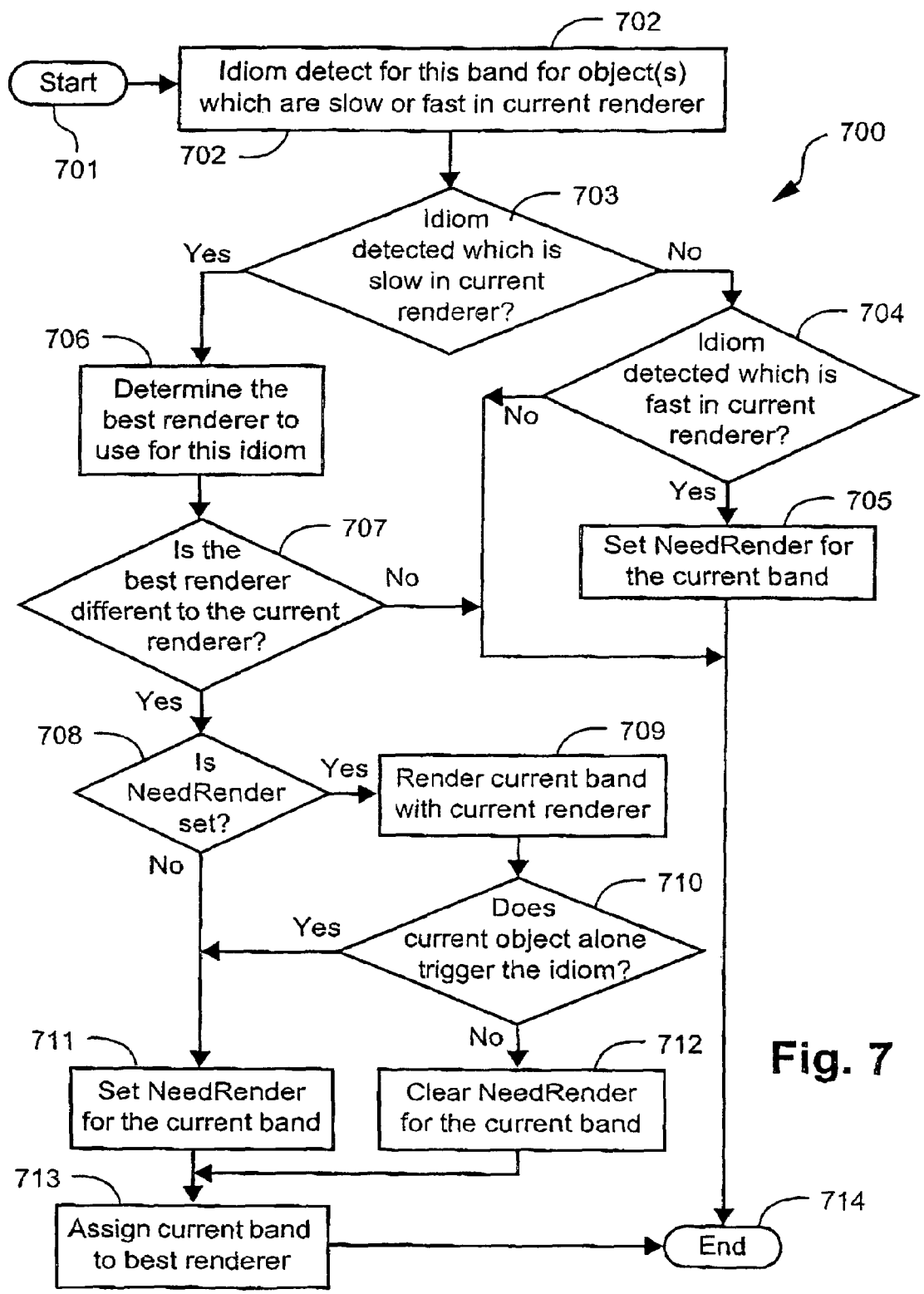
FIG. 7 shows a flowchart describing the idiom detection and renderer switching in the method of FIG. 6.
Figure 26A:
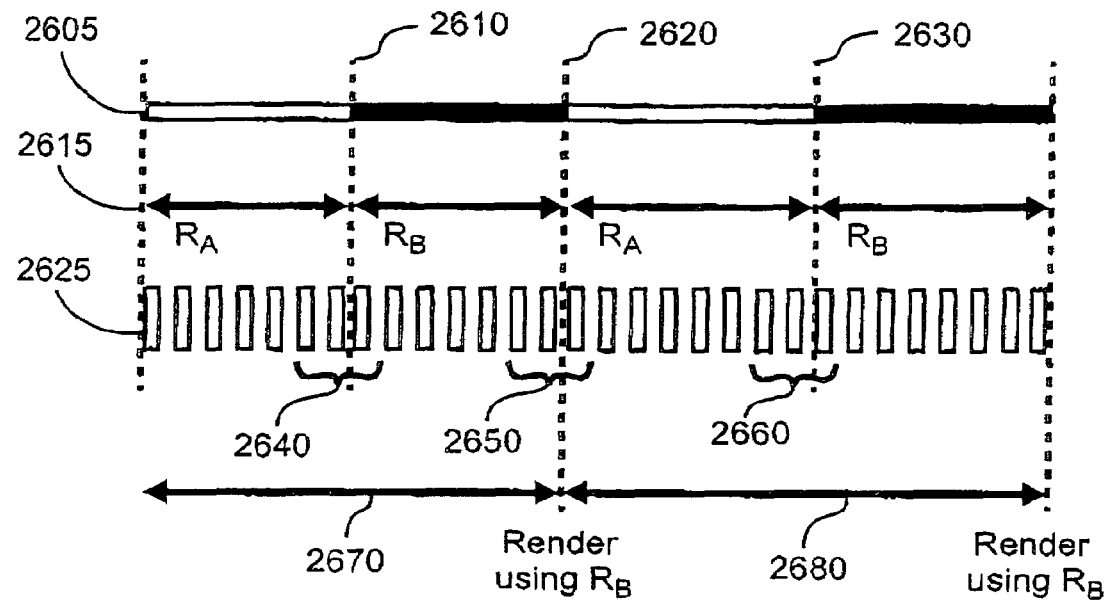
FIGS. 26A to 26C are examples used to illustrate the methods of FIGS. 5 to 7.
Figure 26B:
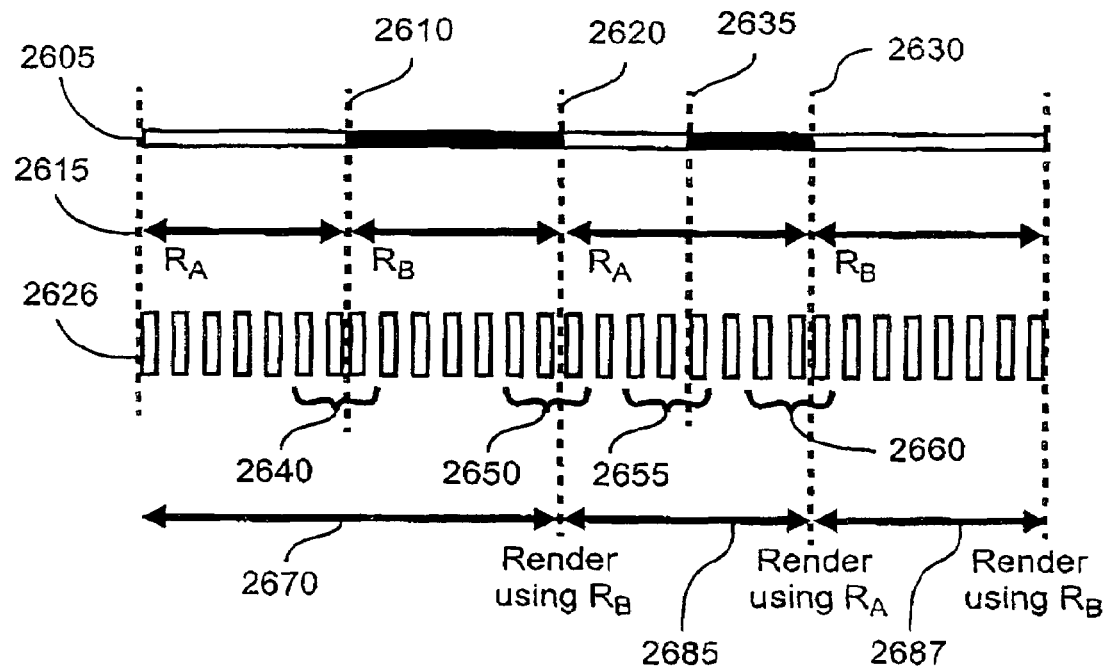
Figure 26C:
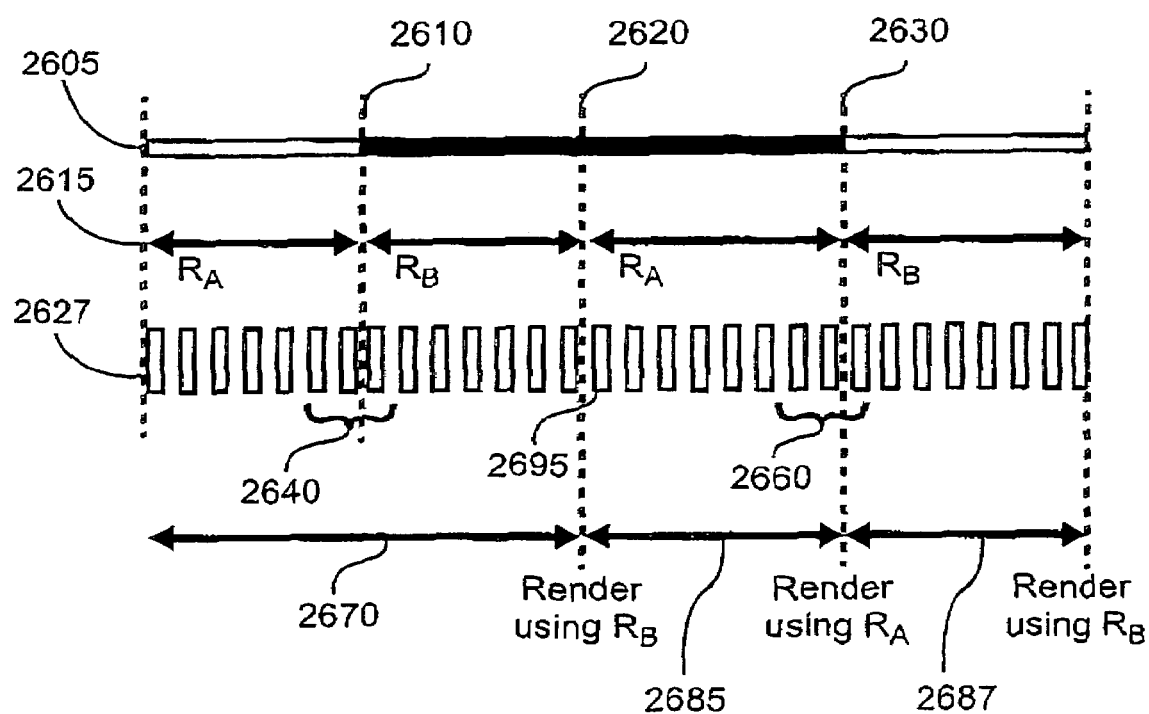

The examples of FIGS. 26A to 26C illustrate the working of the methods of FIGS. 5 to 7. FIG. 26A shows, schematically, a sequence of objects 2625. For convenience, each object is represented as a rectangle although in reality each object may have a different shape and fill. The controlling program 160 receives the sequence 2625 object by object starting with the left-most object in the sequence 2625. The example illustrates switching between two different renderers, $R_A$ and $R_B$. At the start of processing, the current renderer 2615 is $R_A$, and the NeedRender flag 2605 is not set. A solid black fill indicates that the NeedRender flag 2605 is set for the corresponding objects in the sequence 2625. A white fill indicates that the NeedRender flag 2605 is not set.

The first five objects in sequence 2625 do not cause any idiom to be detected, and therefore process 700 cycles through the NO options of steps 703 and 704 for each of these objects. No switching of renderers is required. However, the following set of three objects 2640 together trigger recognition of an idiom, i.e. when the third of the three objects 2640 is received, the controlling program 160 recognizes an idiom that is slow in renderer $R_A$ but fast in renderer $R_B$. Thus step 703 determines that the recognized idiom is slow in the current renderer and step 706 determines that $R_B$ is the better renderer for the idiom 2640.

Because the best renderer differs from the current renderer, step 708 checks whether the NeedRender flag 2605 is set. Since it is not, step 711 sets the NeedRender flag 2605 as indicated by the black fill after the first switch 2610. The current renderer 2615 is set to $R_B$ in step 713.

Note that the first switch 2610 is effected before the currently-considered object is added to the display list.

The next four objects received cause no changes. Then a further set of objects 2650 arrives, triggering a second switch 2620. The objects 2650 lead to recognition of an idiom that is slow in $R_B$ but fast in $R_A$. Process 700 performs steps 703, 706, 707 and then, because the NeedRender flag 2605 is set, the objects in the current display list (indicated by reference numeral 2670) are rendered, in step 709, to a framestore (or bandstore) using the current renderer $R_B$. The set of objects 2670 includes all objects up to, but excluding, the currently-received object. The rendered output may be added as a background to a new display list, and the currently-received object is added to the new display list (step 606). Step 712 clears the NeedRender flag 2605 and step 713 assigns $R_A$ to be the current renderer 2615.

The next few objects received cause no changes, but then the objects 2660 are received, triggering recognition of an idiom that is slow in $R_A$ but fast in $R_B$. This triggers a third switch 2630, which sets the current renderer back to $R_B$ and sets the NeedRender flag 2605. Because the NeedRender flag 2605 was not set at the time of the switch 2630, no rendering occurs at the time of the switch 2630.

The remaining objects received in the sequence 2625 do not cause any further changes of renderer, and therefore at the end of the sequence 2625, all as-yet unrendered objects 2680 are rendered using the current renderer $R_B$.

FIG. 26B shows a similar example to that of FIG. 26A, modified to illustrate the operation of step 704, which detects an idiom that is fast in the current renderer. The input sequence of objects 2626 is the same as sequence 2625, except that sequence 2626 contains a further set of objects 2655 that trigger recognition of an idiom that is fast in renderer $R_A$. The set of objects 2655 is received between switch 2620 and switch 2630, when renderer $R_A$ is the current renderer. Step 704 detects an idiom that is fast in the current renderer, and thus step 705 sets the NeedRender flag 2605. Toggling the NeedRender flag 2605 at point 2635 of the sequence of objects has no immediate effect on the rendering. However, when the objects 2660 cause the switch 2630 back to renderer $R_B$, step 708 detects that the NeedRender flag 2605 is set, and accordingly step 709 renders all as-yet unrendered objects 2685. This ensures that objects 2655 are rendered using renderer $R_A$. At the end of sequence 2626, the as-yet unrendered objects 2687 are rendered using $R_B$.

FIG. 26C shows a similar example to that of FIG. 26A, modified to show the operation of step 710. The input sequence 2627 is the same as sequence 2625, except that it does not include the set of objects 2650. Instead, sequence 2627 includes object 2695, which constitutes a single-object idiom that is slow in $R_B$ but fast in $R_A$. As before, the detected idiom causes switch 2620 back to $R_A$. The difference from FIG. 26A is that, because there is a single-object idiom, the NeedRender flag 2605 is set (step 711), instead of being cleared (step 712). As a result, when objects 2660 trigger the switch 2630 back to $R_B$, the as-yet unrendered objects 2695 are rendered using $R_A$. This ensures that object 2695 is rendered by the most suitable renderer.

Idiom Recognition

Applications which produce graphics, text and/or image output generally do so via some graphics API, such as Microsoft™ GDI. Sometimes, the applications directly put out a PDL such as Postscript, PCL or PDF. Often, the graphics APIs or PDLs have some restrictions. Often, legacy restrictions are supported by the application, or the application data is stored internally in a way which causes compatibility issues with the output graphics API. In these cases, applications tend to produce graphics API calls or PDL instructions which achieve the picture which the application is attempting to output but which can be highly inefficient for the final rendered. The application outputs objects or combinations of objects which cause very inefficient behavior in some types of renderers.

From a printer renderer point of view, identifying the types and patterns of objects must be done empirically. The printer has no possible way to affect what an application produces, so it must be able to correctly render everything that is sent. In theory, there is a huge number of possible combinations and sequences of objects which could cause poor behavior in a renderer. But in practice, applications produce only a few different types or objects and patterns of objects which cause rendering problems. These sequences can be identified empirically by renderer engineers observing the pages output from applications which cause performance problems in the printer controller. The identification of such sequences is then converted into idiom recognition methods.

Examples of such empirically identified objects and sequences, and the idiom recognition method used for each, are given below. In addition, for each idiom, the renderer that performs best and the renderer that performs worst for the idiom detected are identified.

In the second arrangement, this idiom recognition is done on a per band basis. In alternate arrangements, the same or similar idiom recognition techniques could be used on an output image basis (e.g. page), or a the basis.

Large Images

A single object which is a large, arbitrarily rotated, high resolution image is one type of idiom detected.

In the described arrangement, large images have more than 256 k bytes of image data. However, different implementations may have a different threshold and still use the same technique.

In the present disclosure, arbitrary rotation is rotation through an angle which is substantially different to zero degrees, or multiples of 360 degrees. High resolution is a resolution greater than one half the resolution of the page in both x and y.

Figure 8:
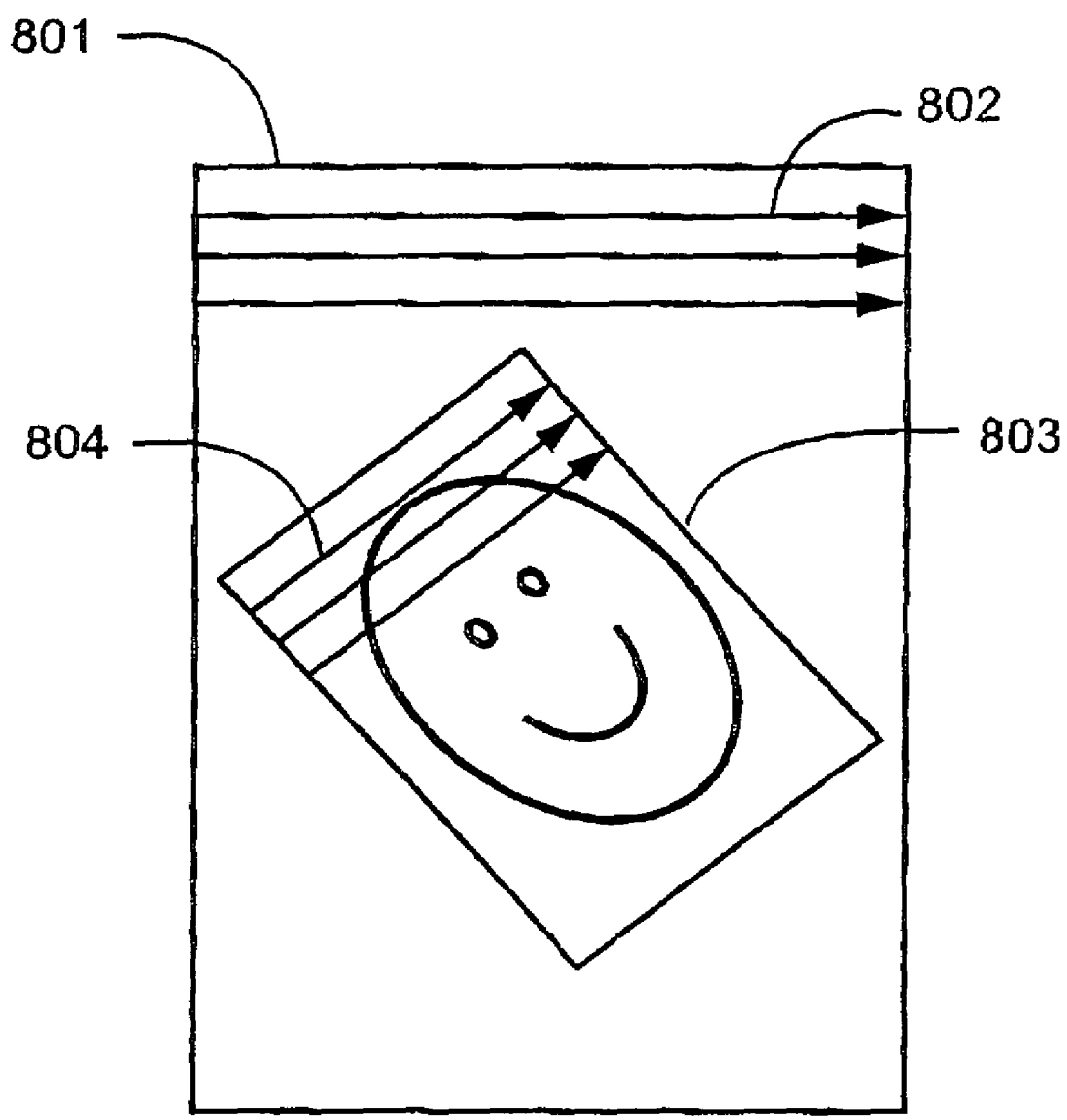
FIG. 8 shows an example of a large rotated images which may be recognized as an idiom in the method of FIG. 7.

Such a large, arbitrarily rotated, high resolution image is shown in FIG. 8. The image 803 must be rendered onto the page 801 at the size and orientation shown. The rotation causes scanlines 804 of the image to be mis-aligned with the scanlines 802 of the page. This causes inefficiencies in a pixel hardware renderer, particularly for high resolution images, as pre-fetching of image data for rendering of subsequent pixels actually wastes time and memory bandwidth. So a memory access is required for every pixel rendered. Typically the memory accesses to image data from a hardware renderer such as rendering apparatus 180 are slower than memory accesses from the host processor 150, so in this case hardware renderer 180 is slower than software render 165.

A large, arbitrarily rotated, high resolution image is best rendered by a software renderer that can take advantage of cached memory accesses for both the image and the page.

So, if an object is detected which is a large, arbitrarily rotated, high resolution image, it will be identified as an idiom that is slow in the pixel-sequential renderer 180. Also, the object will be identified as an idiom that is fast in band renderer 165. Therefore, test 703 will give a "yes" result for a pixel-sequential renderer, and test 704 will give a "yes" result for a band renderer.

Many Tiny Blended Colour Objects

An example of an object sequence which causes pixel-sequential renderer 180 to perform poorly is many tiny objects which contain blended color. Consider, for example, FIG. 9, which shows a letter T 903 having blended color. The color is made up of many small tessellated triangles, each of which has blended color.

Figure 9:
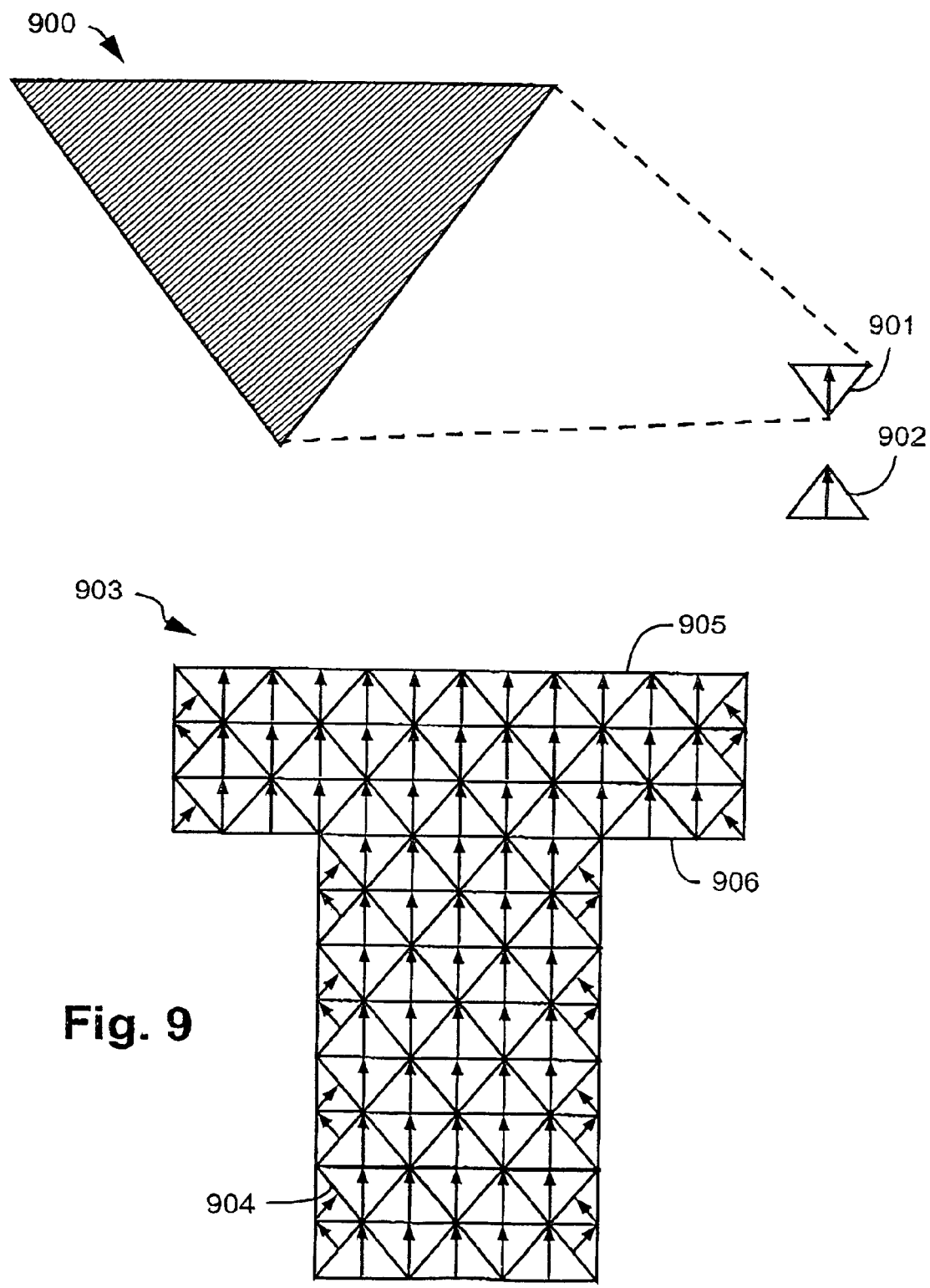
FIG. 9 illustrates an idiom made up of small blended color objects.

Triangle 900 shows such a blended color triangle. The convention used in FIG. 9 is that the blended color is depicted as an arrow to illustrate the blended color in a small triangle. Thus a small version of triangle 900 is depicted for illustrative purposes as triangle 901, with the vertical arrow representing the blended color.

Triangles 901 and 902 depict triangles with linearly blended color. The letter T 903 is made up of many little triangles similar to triangles 901 and 902. The blended color of each of the triangles making up the letter T is different to the blended color of the other triangles. The T 903 is drawn with triangles of blended color to result in an overall non-linear blend of color.

The application 130 does not output the triangles in sequential order. Blended triangle 904 is the first triangle to be received by the printer controller. Then blended triangle 905 is received, followed by blended triangle 906. The order of drawing of the triangles appears random. But when all the triangles are received, the letter T 903 has been drawn. It cannot be assumed that these triangles will arrive in any particular order. It is not even guaranteed that they will end up forming a closed shape, as triangles may arrive for other letters before the T is complete. For other letters, such as "i", "j", and many Chinese characters, triangles may arrive for other sections or the letters before the first section is complete.

The idiom that can be recognized is that objects with a consistent shape and size, and blended color are arriving one after the other. In the example given, the shapes are triangles, but any regular shapes can be recognized as forming an idiom, for example squares, rectangles, quadrilaterals and hexagons. The shapes could describe a scanline, or a row of pixels. That is, the width or height of the shape could be one pixel. In the present disclosure, the outline of a shape is defined by a path, which may contain multiple edges. For example, it is possible for a shape to consist of multiple triangles. This is presented to the Object Preparation block 302 as a single path which consists of multiple edges, each one of which is a triangle.

The idiom recognized consists of shapes with 3 to 12 straight edge segments inclusive. These shapes can be presented as an object made up of a path containing one edge with 3 to 12 straight edge segments. Alternatively, the shapes can be presented as an object made up of a path with multiple edges, all edges having the same number of straight edge segments in the range 3 to 12. The shapes must be substantially the same size and shape, but can have different orientations, as do the triangles in FIG. 9. The shapes must also have a bounding box which has one side less than or equal to 30 pixels.

When more than 18 such regular shaped blended objects are received with no more than two intermixed objects of an alternate type, the idiom is recognized. The sequence of objects is identified as the "many tiny blended color objects" idiom. It is clear that a different threshold could be set to cause the idiom to be recognized. It is also clear that many different types of shapes could be identified as satisfying this idiom. There may be the occasional non-blended, irregular shape intermixed with the regular shapes. This is taken into account by the idiom recognition process, which ignores one or two such anomalies within the last 20 objects. A different threshold for the number of anomalies can be used.

As this type of object sequence causes many edges within a small area, it is not good for a pixel-sequential renderer 180. Also, the blend fills take up a lot of room in the fill table, and too many such objects can either cause the fill table limits to be hit, or, in pixel-sequential renderers where the fill table limit is very high, can cause the fill table to become very large. In either case, inefficiencies arise. So recognizing this idiom causes switching away from a pixel-sequential renderer 180.

The ideal renderer for this type of idiom is a framestore renderer, as it can set all the pixels immediately with no storage of intermediate forms. However, in the second arrangement there is no framestore renderer, and in this case the band renderer 165 performs best of the available renderers.

So, if a sequence of many small blended objects is detected as described above, it will be identified as an idiom that is slow in the pixel-sequential renderer 180. Also, it will be identified as an idiom that is faster in a band renderer 165. Therefore, test 703 will give a "yes" result for a pixel-sequential renderer, and test 704 will give a "yes" result for a band renderer.

Many Tiny Images

Some applications produce line drawings as pixels. These particular applications output images which are one or two pixels in size, and appear to be scattered randomly over the page. But eventually, when all the pixels are drawn, the final page looks like a line drawing or map. In a two-pixel image, usually the pixel colors are the same, but some applications will produce two-pixel images where the pixels have different colors.

Consider the example in FIG. 10, which shows a simplified example of this idiom. The drawing 1000 consists of a curved line on the left, and a straight vertical line on the right. The straight vertical line has a dash pattern.

The curved line on the left is made up of pixels 1001, 1002, 1003 and 1004. Each of these pixels is presented as a single image object to she object receiver 602. That is, the objects are described not as single pixels of flat color, but as images of size one pixel. The curved line is also made up of the two-pixel sections 1005 and 1008. Both of these sections are presented as two-pixel images to the object receiver 602. The pixels in these images have the same color.

The vertical line has a dash pattern. The vertical line is presented as two two-pixel images 1006 and 1007. In this case, the two pixels within each image have different colors.

The application does not output the images in sequential order. In the example, the images are received in the order 1008, 1002, 1006, 1004, 1005, 1003, 1001, and 1007. The order of drawing of the images appears random. But when all the images are received, the line-drawing has been drawn. Thus it cannot be assumed that these images will arrive in any particular order. It is not even guaranteed that they will end up forming a closed shape, as images may arrive for other sections of the line-drawing before this section is complete.

The example shown is small, but in practice millions of one and two pixel images will be received to draw a line-drawing on a single page.

The idiom that can be recognized is that images that are one or two pixels in size arrive one after the other. When more than 27 such one or two pixel images are received with no more than three intermixed objects of an alternate type, die idiom is recognized. The sequence of objects is identified as the "many tiny images" idiom. It is clear that a different threshold could be set to cause the idiom to be recognized. It is also clear that sequences of images which are larger than one or two pixels, for example having up to 10 pixels, could be identified as this idiom. There may be the occasional object intermixed with tiny images which is a larger image, or a different type of object. This is taken into account by the idiom recognition process, which ignores three or less such anomalies within the last 30 objects. A different number of anomalies can be tolerated.

As this type of object sequence causes many edges within a small area, it is not good for a pixel-sequential renderer. Also, the image fills take up a lot of room in the fill table, and too many such objects can either cause the fill table limits to be hit, or, in pixel-sequential renderers where the fill table limit is very high, can cause the fill table to become very large. In either case, inefficiencies arise. Also, storing the image data with the header data needed to identify the image is wasteful. So this idiom causes switching away from a pixel-sequential renderer 180.

The ideal renderer for this type of idiom is a framestore renderer, as it can set all the pixels immediately with no storage of intermediate forms. However, in the second arrangement, there is no framestore renderer, and in this case the band renderer 165 performs best of the available renderers.

So, if a sequence of many tiny images is detected as described above, it will be identified as an idiom that is slow in the pixel-sequential renderer 180. Also, it will be identified as an idiom that is faster in a band renderer 165. Therefore, test 703 will give a "yes" result for a pixel-sequential renderer, and test 704 will give a "yes" result for a band renderer.

Many Small Flat Colour Objects

An example of an object sequence which causes a pixel-sequential renderer to perform poorly is many tiny objects which contain flat color. Consider, for example, FIG. 11, which shows a letter S 1100 having blended color. The color is made up of many tiny four-sided slivers, each of which has flat color. Adjacent slivers have slightly different flat color, resulting in a color blend through the S.

The slivers 1103 and 1104 are adjacent slivers which form a small part of the S. Slivers 1103 and 1104 have colors which are almost the same as one another. Sliver 1105 is a slightly different color to sliver 1104, and sliver 1106 is a slightly different color to sliver 1105. In this way, a letter S is created which is made up of a gradually changing blended color.

The application 130 does not output the slivers in sequential order. In this example, the slivers are drawn in the order 1101, 1102, 1106, 1103, 1104, and 1105. Once all the slivers are drawn, the letter S has been drawn.

The idiom that can be recognized is that small objects with flat color are arriving one after the other. The objects must be substantially the same size, but can have different orientations, as do the slivers in FIG. 11. The objects might overlap, and in practice occasionally do so. In the present disclosure, the idiom is recognized when the objects have flat color and have a bounding box which has one side less than or equal to 30 pixels.

When more than 18 such small, flat color objects are received with no more than two intermixed objects of an alternate type, the idiom is recognized. The sequence of objects is identified as the "many small flat color objects" idiom. It is clear that a different threshold could be set at which the idiom is recognized. Also, a different bounding box size limit could be used. It is also clear that many different types of shapes could be identified as this idiom. The shapes could be only triangular, or only rectangular, or in fact have any number of straight edge segments. The shapes can be presented as an object made up of a path containing one edge. Or the shapes can be presented as an object comprising of a path with multiple edges. The distinguishing point is that the objects are small in at least one dimension, not that they are a particular shape. The described arrangements look at the bounding box size, but alternative arrangements may look at the shape detail, see the orientation of the object, and gauge the distance in pixels between the object's sides. This gives a more accurate estimate of the actual width of the sliver, but requires more processing time to calculate.

There may be the occasional large object, or object that does not have flat color, intermixed with the small flat color objects. This is taken into account by the idiom recognition process, which ignores two or less such anomalies within the last 20 objects. A different number of anomalies can be used.

Also, the flat color objects might be clipped. In fact, the object might be defined to be large in itself, but being clipped to the shape of the sliver. The objects then are presented with the sequence: clip, object, clip, object, clip, object, and so on. The idiom recognition recognizes that in fact each "clip, object" pair is the size of the clip, and uses the same method as described above to recognize the "many small flat color objects" idiom. However, in this case the bounds of the flat color object are limited to the bounds of the clip if the clipped area is smaller than the flat color object.

In practice, when text is drawn using this method, several thousand slivers are drawn to make up one letter. Then, shading or highlighting of the letter might be done using the same sliver drawing technique. As all the slivers have slightly different color, in a pixel-sequential renderer they will each require a different level. So each letter needs many thousands of levels. This might case the level table limits to be reached. Also, as the slivers are densely packed, there are many edges within a small area. The combination of many levels and many edges causes a pixel-sequential renderer to run slowly. So recognition of this idiom causes switching away from a pixel-sequential renderer 180.

The ideal renderer for this type of idiom is a framestore renderer, as it can set all the pixels immediately with no storage of intermediate forms. However, in the second arrangement, there is no framestore renderer, and in this case the band renderer 165 performs best of the available renderers.

So, if a sequence of many small flat color objects is detected as described above, it will be identified as an idiom that is slow in the pixel-sequential renderer 180. Also, it will be identified as an idiom that is faster in a band renderer 165. Therefore, test 703 will give a "yes" result for a pixel-sequential renderer, and test 704 will give a "yes" result for a band renderer.

Many Tiny ROP3 or ROP4 Objects

A ROP3 is a bitwise logical operation of three arguments (source pattern and destination). A ROP4 is a bitwise combination of the result of two ROP3s, each taking The same three arguments, where the choice of ROP3 is controlled by a fourth argument (mask).

An example of an object sequence which causes a pixel-sequential renderer to perform poorly is many tiny objects which contain ROP3s of an image and a flat color. Consider, for example, FIG. 12 which shows an input image 1200 and the output picture 1210 on the page. The output picture 1210 is made up of sections of the input image 1200, abutted and adjusted using a ROP3 to make an image having a different appearance.

This effect is achieved by clipping sections of the image 1200 and combining the clipped sections with a flat color using a ROP3 operation to make the output picture 1210. Initially, input image 1200 is clipped using clip path 1204. Clipping yields the visible input image section 1201, which is combined with a flat color using a ROP3 to give the output section 1211. Next, input image 1200 is clipped using clip path 1205. Clipping yields visible input image section 1202, which is combined with a flat color using a ROP3 to give the output section 1212. Output sections 1213, 1214 and 1215 are similarly constructed using input image section 1202. Finally, input image 1200 is clipped using clip path 1206. The clipping yields visible input image section 1203, which is combined with a flat color using a ROP3 to give the output section 1216.

The object receiving step 602 receives objects in the sequence "clip, image, flat ROP3, clip, image, flat ROP3, clip, image, flat ROP3, etc". Often, the image data is sent anew every time, as if each clipped section was cut from a different image. Sometimes, but not always, the newly-received clipped section is cut from a different image. Also, the flat color may be changed with every new "flat ROP3" in the sequence. The sections clipped can be numerous, small and densely packed.

In a related idiom, the clip can be omitted, and the sequence is "image, flat ROP3, image, flat ROP3, image, flat ROP3, etc".

In another related idiom, ROP4 s can be used, adding a third object to the sequence. The third object is generally an image which is a bitmap that acts as a mask This is referred to as "bitmap". The sequence can then be either "clip, image, flat, bitmap ROP4, clip, image, flat, bitmap ROP4, clip, image, flat, bitmap ROP4, etc" or "image, flat, bitmap ROP4, image, flat, bitmap ROP4, image, flat, bitmap ROP4, etc".

Some of the objects might be excluded from the sequence if they do not change from one ROP3 or ROP4 operation to the next.

The idiom that can be recognized is that a sequence of objects occurs as indicated above. The same type of object recurs as the second, third or fourth object in the incoming object stream. Intervening objects also have repeated types in the sequence. For the idiom to be recognized, the objects in the sequence need to be small in at least one dimension (width of the object), or result in a small drawing oil the output, as happens when the clip restricts the effect of the drawing. In the arrangements of the present disclosure, the idiom is recognized when the drawing output has a bounding box which has one side less than or equal to 30 pixels.

When more than 20 such sequences of repeated objects which generate small drawing output are received, the idiom is recognized. The sequence of objects is identified as the "many tiny ROP3 or ROP4 objects" idiom. It is clear that a different threshold could be set at which the idiom is recognized. It is also clear that many different sequences of objects could be identified as satisfying this idiom, with the objects of the same type recurring at different points in the sequence. The described arrangements look at the bounding box size to determine if the effect of the object drawing is small, but an alternate arrangement could look at the object and clip shape detail, see the orientation of the object, and gauge the distance in pixels between its sides. This alternative gives a more accurate estimate of the actual width of the output drawing, but requires more processing time to calculate. Also, the bounding box size limit may be varied.

The example in FIG. 12 has six output drawing sections. This is simply for illustration and in practice applications may produce several thousand output drawing sections to make one output picture. For a pixel-sequential renderer, this leads to heavy usage of edges, levels and fills, and causes a pixel-sequential renderer to run slowly. So this sequence of objects causes switching away from the pixel-sequential renderer 180.

The ideal renderer for this type of idiom is a framestore renderer, as it can set all the pixels immediately with no storage of intermediate forms. However, in the second arrangement, there is no framestore renderer, and in this case the band renderer 105 performs best of the available renderers.

If a sequence of many tiny ROP3 or ROP4 objects is detected as described above the sequence is identified as an idiom that is slow in the pixel-sequential renderer 180. Also, the sequence will be identified as an idiom that is faster in band renderer 165. Therefore, test 703 will give a "yes" result for a pixel-sequential renderer, and test 704 will give a "yes" result for a band renderer.

Large Overlapping Objects

Figure 13:
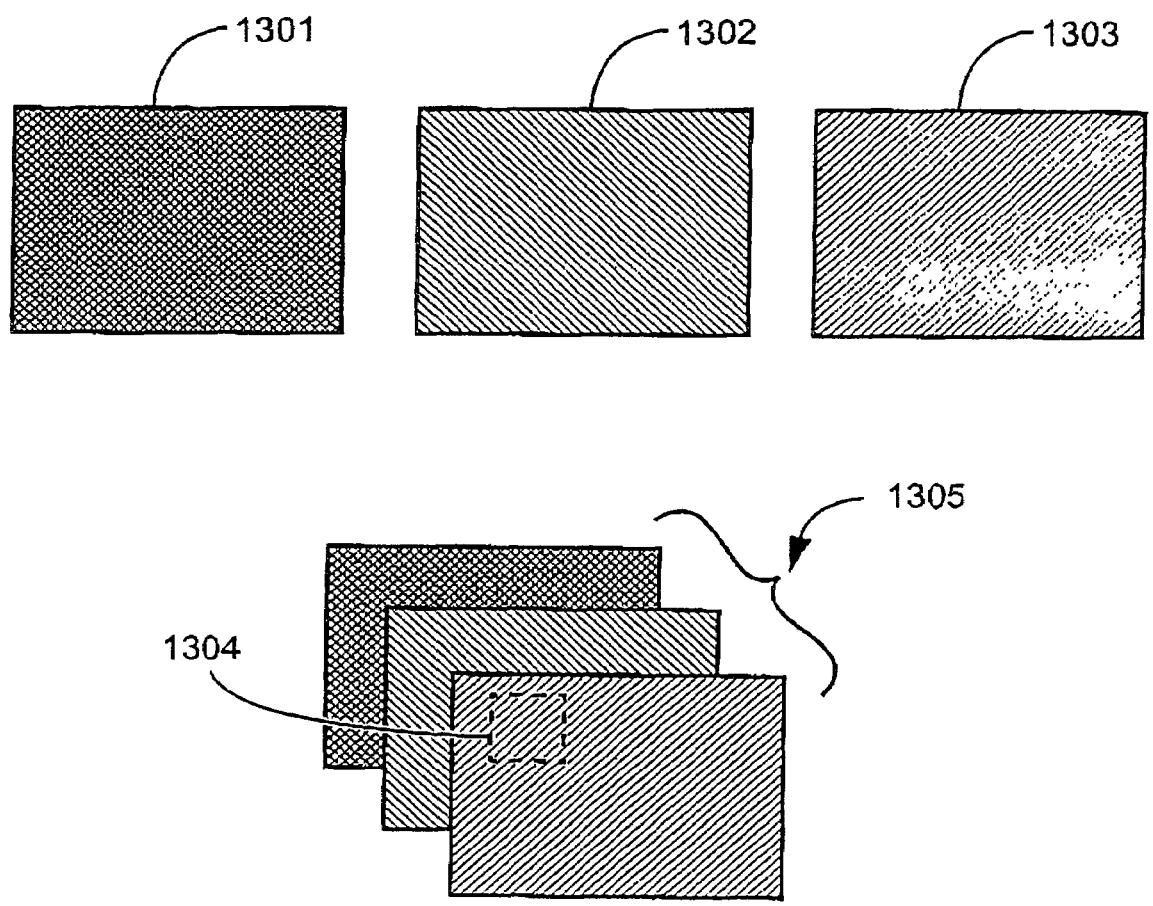
FIG. 13 illustrates an idiom made up of large overlapping objects.

Overlapping objects cause a band renderer to perform poorly. Consider, for example, FIG. 13, which shows three objects 1301, 1302, 1303 that overlap, The rearmost object 1301 is partially obscured by the next object 1302, which is in turn partially obscured by the front object 1303. The end result is the drawing 1305. A band renderer renders objects one at a time, and so sets pixels three times in the area where all three objects overlap. In area 1304, object 1301 is drawn first, then object 1302, then object 1303. Only the pixels from 1303 have any effect on the final image 1305, so the band renderer has in fact done three times as much work as it needs to in this area. A pixel-sequential renderer, however, only draws the object on top, and hence is much more efficient with this type of idiom.

The idiom recognized in the described arrangements is that the last 9 objects were larger than 100 pixels in both the x and y directions, and the bounding boxes of at least 3 of the objects overlap the bounding box of one or more other objects by at least 20 pixels in either x or y. The calculation of the object size and bounding box overlap takes into account any clipping which is affecting the objects.

The number of objects that comprise the idiom, the sizes of the objects and the size of the required overlap may be varied.

There may be the occasional small object intermixed with the large objects. This is taken into account by the idiom recognition process, which allows one such anomaly within the last 10 objects. A different number of anomalies can be tolerated.

If a sequence of overlapping objects is detected as described above, the sequence is identified as an idiom that is slow in a band renderer 165. Also, the sequence is identified as an idiom that is fast in a pixel-sequential renderer 180. Therefore, test 703 will give a "yes" result for a band renderer, and test 704 will give a "yes" result for a pixel-sequential renderer.

Large Amounts of Text

An example of an object sequence which causes a band renderer to perform poorly compared to a hardware pixel-sequential renderer is large amounts of ordinary text. In ordinary text, characters are drawn using a single bitmap, or path or edge set. The pixel-sequential renderer 180 traces the edges of ordinary text efficiently, and sets only the pixels that need to be set.

The idiom that is recognized in the described arrangements is that the last 28 objects are characters which are larger than 40 pixels in both the x and y directions. Only the bounding box of each character is considered.

There may be the occasional non-text object intermixed with the characters. This is taken into account by the idiom recognition process, which allows two or less such anomalies within the last 30 objects. A different number of anomalies can be tolerated.

The number of objects that comprise the idiom, and the sizes of the objects may be varied in implementing the idiom recognition.

If a sequence of text characters is detected as described above, the sequence is identified as an idiom that is slow in a band renderer 165. Also, the sequence is identified as an idiom that is fast in a pixel-sequential renderer 180. Therefore, test 703 will give a "yes" result for a band renderer, and test 704 will give a "yes" result for a pixel-sequential renderer.

Large Blended Colour Objects

Figure 14:
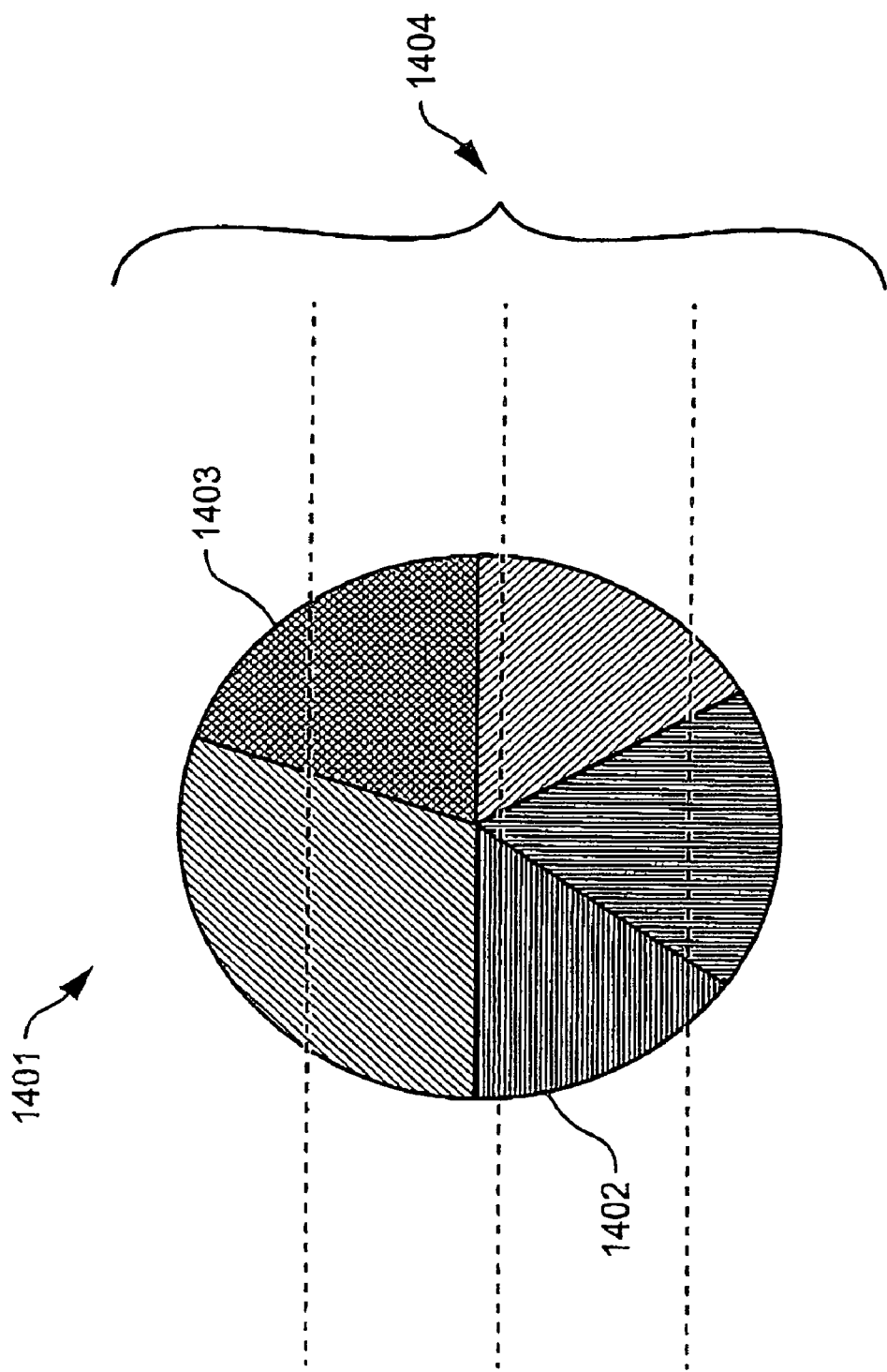
FIG. 14 illustrates an idiom made up of large flat or blended color objects.

An example of an object sequence which causes a band renderer to perform poorly is large blended color objects. Consider, for example, FIG. 14, which shows a pie chart 1401 made up of five large objects with linearly blended color. The four bands 1404 are spanned by the pie chart. To draw the pie chart 1401, a band renderer 165 must access the four bands 1404. The objects span several bands. For example, object 1403 spans two bands, and object 1402 spans three bands. This means the band renderer 165 has to add each object to several band display lists, which can incur a small overhead.

Also, the blended color is calculated individually for each pixel for the objects. In the described arrangements, the pixel-sequential renderer 180 has the blend calculation implemented in hardware. Also, the pixel-sequential renderer 180 calculates all pixels sequentially, and hence does not have the extra overhead of accessing an object from multiple display lists. This makes the calculation and pixel generation more efficient for the pixel-sequential renderer 180.

The idiom that is recognized is that the last 4 objects were larger than 100 pixels in both the x and y directions, and the fills of the objects were blended colors. The calculation of the object size takes into account any clipping which is affecting the objects. In this case, the bounds of the large blended color object are limited to the bounds of the clip if the clipped area is smaller than the large blended color object.

The occasional small object may be intermixed with the large objects. This is taken into account by the idiom recognition process, which allows one such anomaly within the last 5 objects. A different number of anomalies can also be tolerated.

The number of objects that comprise the idiom, and the sizes of the objects set for idiom recognition may be varied.

If a sequence of large blended color objects is detected as described above, the sequence is identified as an idiom that is slow in a band renderer 165. Also, the sequence is identified as an idiom that is fast in a pixel-sequential renderer 180. Therefore, test 703 will give a "yes" result for a band renderer, and test 704 will give a "yes" result for a pixel-sequential renderer.

Large Flat Colour Objects

Large areas of flat color are most efficiently dealt with by a pixel-sequential renderer. The pixel-sequential renderer 180 can specify runs of repeated colors to the downstream hardware when being sent to the printer 195. So if, for example, the pie chart of FIG. 14 were made up of flat colors, the pie chart would be most quickly rendered to the printer by a pixel-sequential renderer 180.

However, if the band pixel data is needed in memory, and is not to be sent to a printer, then the efficiency of both the pixel-sequential renderer 180 and the band renderer 165 are comparable. Rendering band pixel data to memory occurs in step 709.

The idiom that is recognized is that the last 4 objects were larger than 100 pixels in both the x and y directions, and the fills of the objects were flat colors. The calculation of the object size takes into account any clipping which is affecting the objects. In this case, the bounds of the large flat color object are limited to the bounds of the clip if the clipped area is smaller than the large flat color object.

There may be the occasional small object intermixed with the large objects. This is taken into account by the idiom recognition process, which, in the described arrangements, allows one such anomaly within the last 5 objects. A different number of anomalies can be tolerated.

If a sequence of large flat color objects is detected as described above, the sequence is identified as an idiom that is slow in a band renderer 165. However, the sequence is not identified as an idiom that is fast in a pixel-sequential renderer 180. That is, test 703 will give a "yes" result for a band renderer, but test 704 will give a "no" result for a pixel-sequential renderer. Consequently, the NeedRender flag is not set for the current band if this idiom is recognized while the current renderer is the pixel-sequential renderer 180. Thus, if later an idiom is recognized that causes a switch from the pixel-sequential renderer 180 to the band renderer 165, there will be no forced render of the band first, as the band renderer 165 can deal with flat colors into memory quite efficiently.

Idiom Recognition

The idiom recognition process of step 702 will now be explained in more detail. As described previously with relation to FIG. 6 and FIG. 7, the idiom recognition process 702 is performed for each band that includes the incoming object. The description of all data handling and flowcharts regarding process 702 refers to data which is handled on a per-band basis.

Figure 15A:
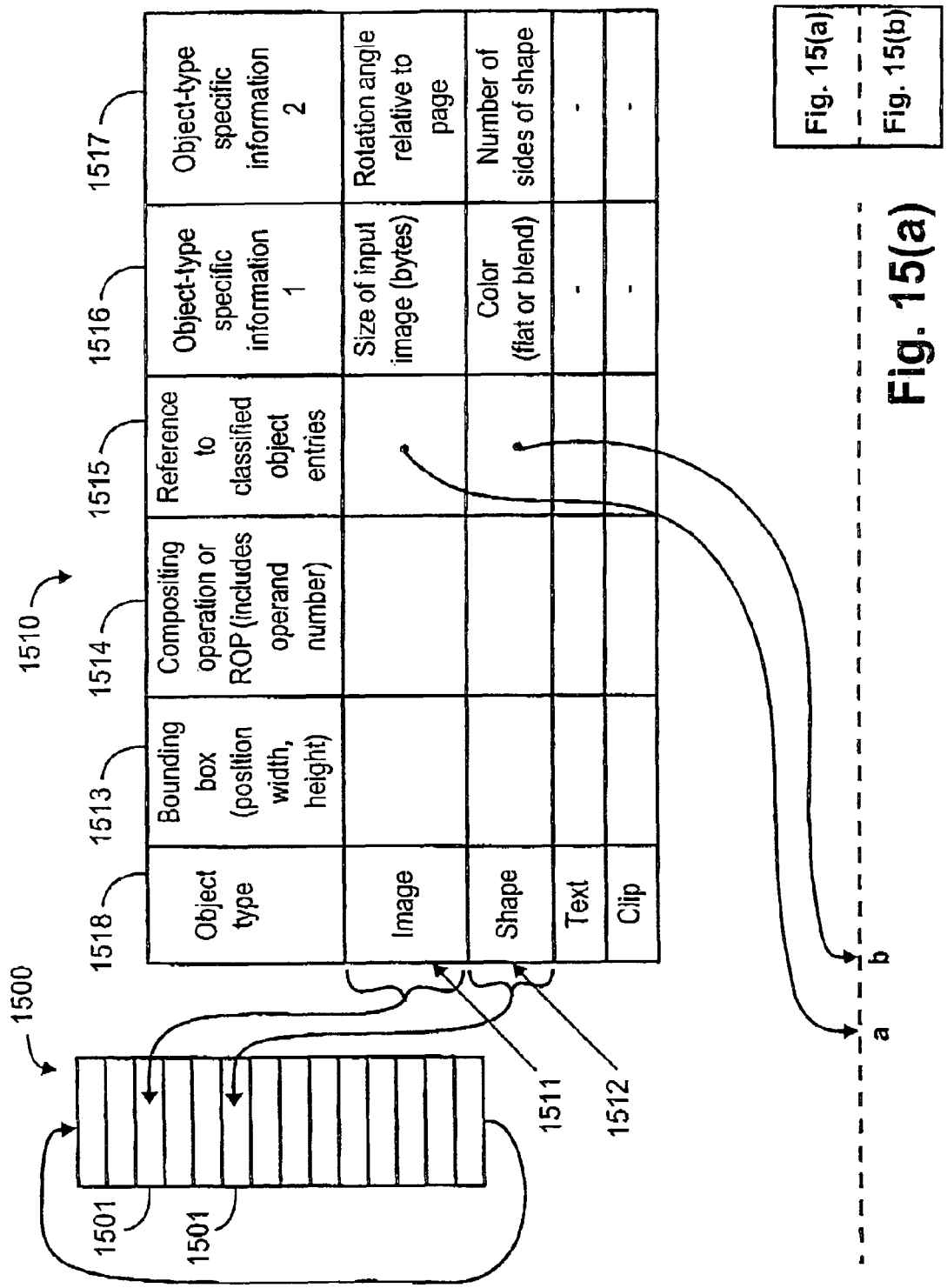
FIGS. 15(a) and 15(b) shows a schematic block diagram of a circular list used for idiom recognition and object information contained in the circular list, together with the classified object hash table and the classified object entries to which the hash table controls access.
Figure 15B:
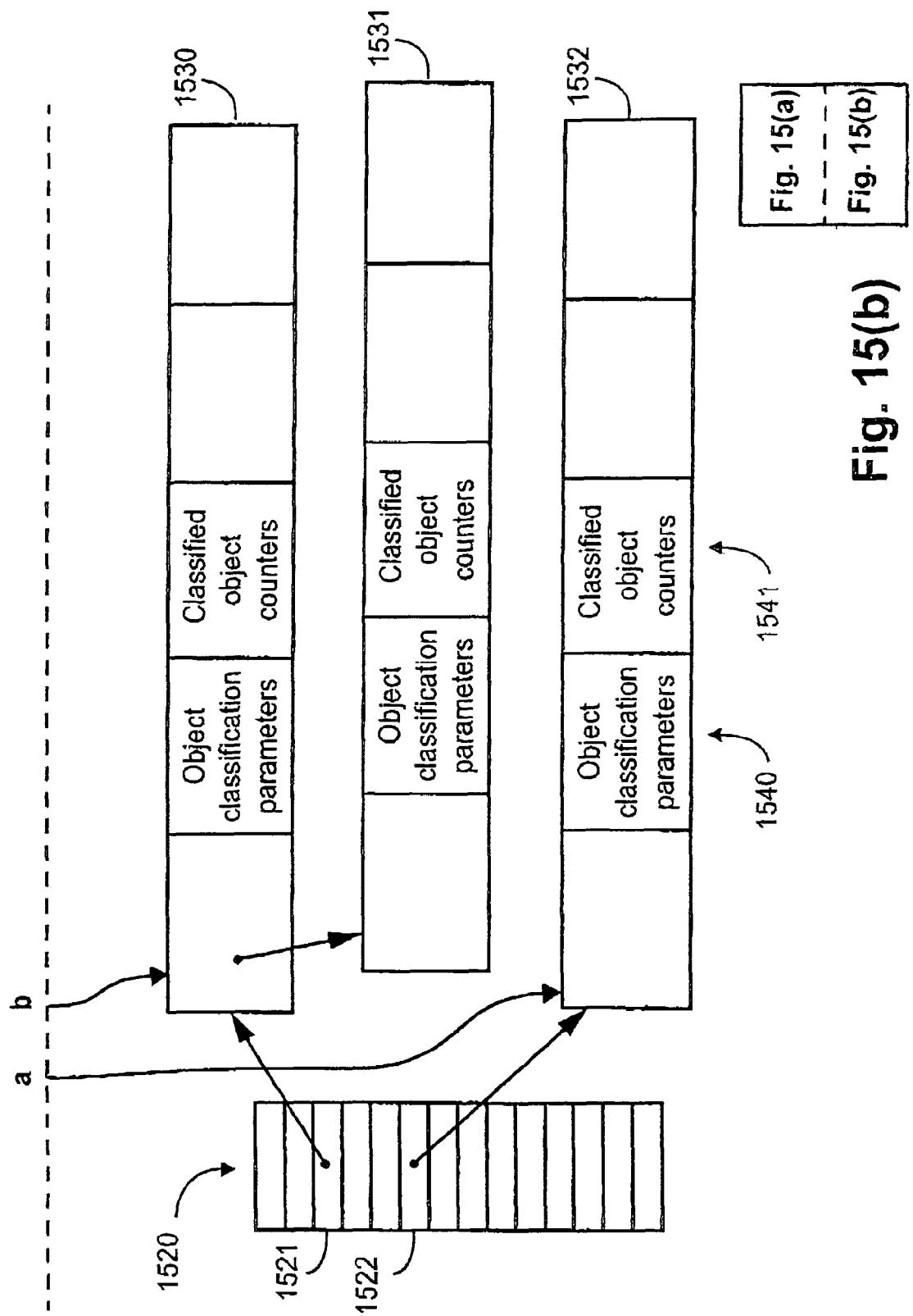

The idiom recognition process 702 performed by the controlling program 160 uses a circular list 1500 per band of information per object, for the last 100 objects. The circular list 1500 is shown in FIGS. 15(*a*) and (*b*), shortened for illustrative purposes.

The information which is kept for each object in list 1500 is detailed in table 1510. Each circular list element contains one object-specific information element. For example, circular list entry 1501 contains an image element with structure 1511 as detailed in table 1510, and circular list entry 1502 contains a shape element with structure 1512. As each new object is received by the controlling program 160, the information kept about the new object is placed at the head of the circular list 1500 for each band that contains the object.

Each of the 100 elements in the circular list 1500 keeps information about the object which was received when that element was the head of the list. Once the circular list 1500 is full, as each new object arrives the oldest element is overwritten by the newest element.

The table 1510 includes information regarding object type 1518. The possible object types are image, shape, text and clip. The bounding box 1513 of each object is kept. The bounding box information 1513 includes the object's position, width and height. The POP operation 1514 used to draw the object on the page is also recorded. This ROP information 1514 includes the operand number or type (e.g. source, pattern or mask) of this object, as well as the compositing operation itself. The object type 1518, bounding box 1513 and ROP information 1514 is kept for all objects. References 1515 to the classified object entries 1530 maintained for an object are also kept in table 1510.

Also, object-type specific information 1 (1516) and object-type specific information 2 (1517) are kept in table 1510. The object-type specific information 1516 and 1517 kept is different for each object type 1518. Images store the size of the image data as information 1516 and the angle of rotation relative to the page as information 1517. Shapes store the color of the shape (blend or flat) as information 1516 and the number of straight edge segments of the shape as information 1517. Text and clips store no additional information.

A single object may have multiple classifications arid may have multiple counters associated with it. The reason for this will be explained later with reference to FIG. 16. Also, multiple objects within a band need to be able to share the same counters. Thus, all objects of one type within a band are counted by using the same counter. This helps in the analysis of idioms. The multiple access of single counters is arranged via a hash table 1520.

Classified object entries are accessed via the hash table 1520. There is a separate hash table 1520 for each band. The object classification parameters 1540, being object type 1518, object size classification (based on bounding box size and size limits per object type as described with reference to FIG. 16), compositing operation or ROP type, object color type (flat or blend, for shapes), number of straight edge segments (for a shape), and rotation angle (for an image), are combined to a hash value using a hash function. A hash function that can be used in this context is the CRC32 Cyclic Redundancy Check, applied to the described data represented as a sequence of bytes. The CRC32 function is well known in the field of digital networking. The modulus of the hash function value with the table size is used to index the hash table 1520. In one example, the index 1521 is calculated. The entry in the hash table 1520 with the index 1521 contains a pointer to the classified object entry 1530. Thus classified object entry 1530 is accessed from the hash table. The classified object entry 1530 contains a pointer (which may be unused) to another classified object entry, the object classification parameters 1540 and the classified object counters 1541. If a new, different object is analyzed as having the same object classification parameters as classified object entry 1530, the new object will hash to the same index. Then the object classification parameters of the new object and the classified object entry 1530 will be compared, and found to be identical. Consequently, the new object will use the classified object entry 1530 and the classified object counters 1541 contained therein.

If a different set of classified object parameters hash to the same index, the different classified object entry 1531 will be dynamically created and linked to the existing classified object entry 1530. Usually, a different set of classified object parameters will hash to a different index 1522. The new classified object entry 1532 will be dynamically created, and a pointer to the classified object entry 1532 will be placed in the hash table entry indexed by index 1522. Thus classified object entry 1532 will be accessed via the hash table index 1522.

When all the classified object counters 1541 for a classified object entry become zero, the classified object entry is removed from the collection and is freed.

In the arrangements of the present disclosure, this collection is managed via a hash table 1520, but any other known collection management method could be used, such as a linked list, tree, database with key access, array, or any other of a wide range of known data structures with known access methods.

When the classified object entries have been set up for an object, pointers to those entries are made from the field in the circular list reference to classified object entries 1515. These references store pointers to the classified object entries, so that it is possible to access the classified object counters 1541 from the circular list 1500. In this way, the counters which are to be analyzed when the object reaches a significant place in the circular list 1500 can be easily accessed.

In addition, using this technique, all the objects with the same classified object parameters access the same counters. Thus accumulating and monitoring the counters is straightforward.

Most idioms are detected by keeping running statistics on the objects seen recently. The contribution of the older objects is subtracted when they can no longer contribute to an idiom in the current idiom recognition process. FIGS. 16(a) and (b) shows a table 1600 which gives an example of the running idioms kept, and the counts which are kept in each case. For each different object category 1601 seen recently, the idiom recognition process 702 keeps classified object counters 1541 of the number of times this category of object has been encountered within a given range of recent objects. Counters are kept for the last 5 objects, the last 10 objects, the last 20 objects, the last 30 objects, the last 40 objects, the last 60 objects and the last 80 objects.

The table 1600 indicates for the cases shown which counters are maintained. Most objects fall into only one object category. However, small, blended color objects can be classified in both the small shape, n edge segments, blended color category 1617 and in the small shape, blended color category 1618.

For small shape, n edge segments, blended color objects (category 1617), a new counter is started for any shapes with n in the range 3 to 12. For example, if a small, six-sided blended color shape has been encountered, the counter for the last 20 small, six-sided blended color shape objects will be incremented.

In addition, the counters for the last 20 objects, the last 40 objects, the last 60 objects and the last 80 objects for small blended color shapes (category 1618) will be incremented. This is because the small, six-sided blended color shape can contribute to a number of different idioms, as described above. The counter for the "many tiny blended color objects" idiom counts 20 objects. The counter for the "many tiny ROP3 or ROP4 objects" idiom could count 20, 40, 60 or 80 objects, depending on the sequence. So all the counters that could be needed to identify an idiom are kept.

As stated earlier, separate counters for up to 20 objects are kept for small, blended color shapes with different numbers of edge segments. This is because the "many tiny blended color objects" idiom requires the shapes to have the same number of edge segments. However, the "many tiny ROP3 or ROP4 objects" idiom only needs the objects to be small. Thus one object may contribute to a number of different counters. Four and six sided shapes are counted in a single counter for one idiom, but in separate counters for a different idiom.

When a small, six-sided blended color shape becomes the $21^{st}$ object in the circular list 1500 of information per object, the counter for the last 20 small, six-sided blended color shapes 1617 is decremented. Also, the counter for the last 20 small blended color shapes is decremented. When a small, six-sided blended color shape becomes the $41^{st}$ object in the circular list 1500 of information per object, the counter for the last 40 small, blended color shapes is decremented, and so on. Using this technique, the counters are maintained accurately for all the possible types of objects.

The counters per object category are dynamically assigned, as described previously with relation to FIG. 15. When an object is encountered, its category is determined based on the constraints described in the idiom recognition examples above. For example, for a shape, the number of straight edge segments in the shape is determined, as well as the bounding box and color of the shape. Any clip is taken into account when determining the size and number of edge segments. That is, if the clip bounds are smaller than the object bounds, the smaller bounds are used. Suppose, for example, that the shape has 6 edge segments and blended color, and has a bounding box which is no more than 30 pixels wide in either the x or y direction. The shape will then be classified as a small 6-sided blended color shape.

The list of classified object entries which are currently being counted is accessed via the hash table 1520 to find if a small six-sided blended color shape entry already exists for this band. If it does, the counters for the category are incremented. If the entry does not exist, the small six-sided shape classified object entry is created. The counters for the new entry are set to one, and the entry is added to the hash table 1520 as previously described.

Using the empirically determined characteristics and limits described earlier, the idiom recognition process determines the classification of the object and puts the object into an object category 1601. The idiom recognition process also determines which counters should be maintained for the object category. Referring to FIG. 16, if the object is classified as a large flat color object 1610, counters for the object category in the last 5 and last 10 objects are maintained for the object. If the object is classified as a large blended color object 1611, counters for the object category in the last 5 and last 10 objects are maintained. If the object is classified as a large (larger than 100 pixels in x and y), arbitrarily rotated object 1612, a counter for the object category in the last 10 objects is maintained. If the object is classified as a tiny (less than 3 pixels total) image object 1613, a counter for the object category in the last 30 objects is maintained. If the object is classified as a small (less than 30 pixels in either x or y) image object 1614, counters for the object category in the last 20, the last 40, the last 60 and the last 80 objects are maintained. If the object is classified as a small flat color shape object 1616, counters or the object category in the last 20, the last 40, the last 60 and the last 80 objects are maintained. If the object is classified as a small blended color shape object, with n edge segments 1617 where n is between 3 and 12 inclusive, a count of the object category in the last 20 objects is maintained for each particular value of n. If the object is classified as a small blended color shape object 1618, counts of the object category in the last 20, the last 40, the last 60 and the last 80 objects are maintained. Note that an object might be classified as both a small blended color shape, with n edge segments 1617, and as a small blended color shape object 1618 as previously described. If the object is classified as a text character object 1619 larger than 40 pixels in either x or y, a count of the object category in the last 30 objects is maintained. If the object is classified as a text character object 1620 with less than 30 pixels in either x or y, counts of the object category in the last 20, the last 40, the last 60 and the last 80 objects are maintained. Such objects may contribute to the ROP3/ROP4 idiom. If the object is classified as a clip object 1621 with less than 30 pixels in either x or y, counts of the object category in the last 20, the last 40, the last 60 and the last 80 objects are maintained. If the object cannot be classified as contributing to any idiom, it is still included in the classification list, but it has no counters, as shown in the table entry Other 1622.

Figure 17:
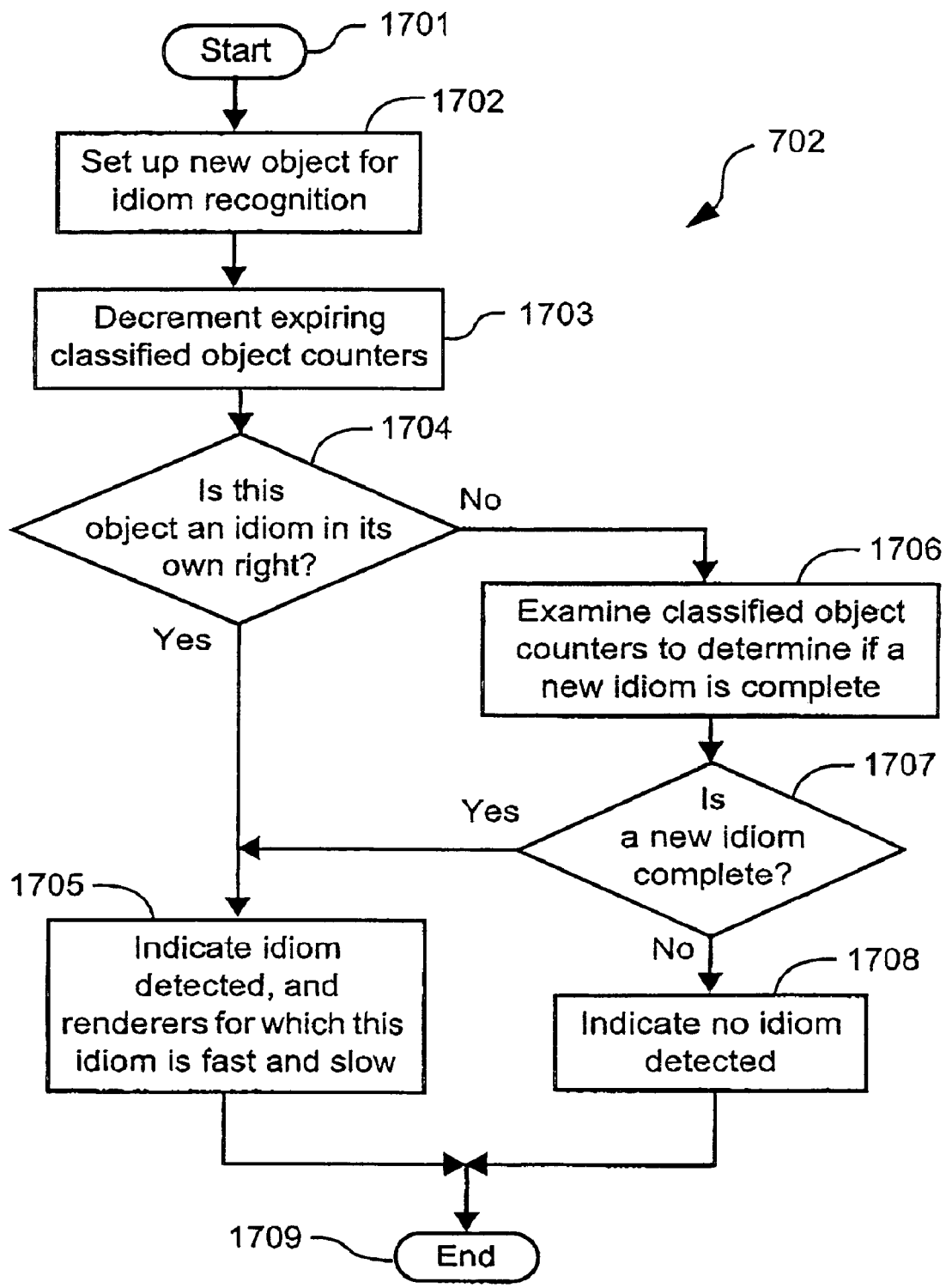
FIG. 17 shows a flowchart of the idiom recognition step used in the method of FIG. 7.

The idiom recognition process 702 performed by the controlling program 160 is now further described with reference to FIG. 17. The idiom recognition process 702 starts in step 1701 In step 1702, the new object received in step 602 is set up for idiom recognition for the current band. In step 1702, the new object is classified and added to the collections used for idiom recognition. This is further described with reference to FIG. 19. Next, the classified object counters which are referenced by expiring objects are decremented in step 1703 This is described in more detail with reference to FIGS. 20 and 21.

At the next stop 1704, the controlling program 160 chocks whether the object is all idiom in its own right, that is, if the object is detected as an idiom without the need for other objects to contribute to the sequence. This will occur, for example, with very large arbitrarily rotated images as described above as the "large images" idiom. If this object is detected as an idiom (the YES option of step 1704), step 1705 is executed, in which the idiom detected for the current band is indicated, and the fast and slow renderers for the idiom are identified. The information regarding which renderer is fast and which is slow is stored per idiom type, identified empirically as described earlier. Thus, once an idiom is identified, the renderers for which the idiom is fast and slow are known. This information is later used in step 706 to determine the best (fastest) renderer for the detected idiom.

If the object is not detected as an idiom in its own right (the NO option of step 1704), the classified object counters are examined in step 1706. This is explained in further detail with reference to FIG. 18. Step 1707 determines whether the examination resulted in identifying that a new idiom is complete. If so (the YES option of step 1707) execution proceeds to step 1705. If no new idiom has been identified (the NO option of step 1707), execution proceeds to step 1708, which indicates that no new idiom has been detected. After both step 1705 and step 1708, the process 702 completes in step 1709.

Figure 18:
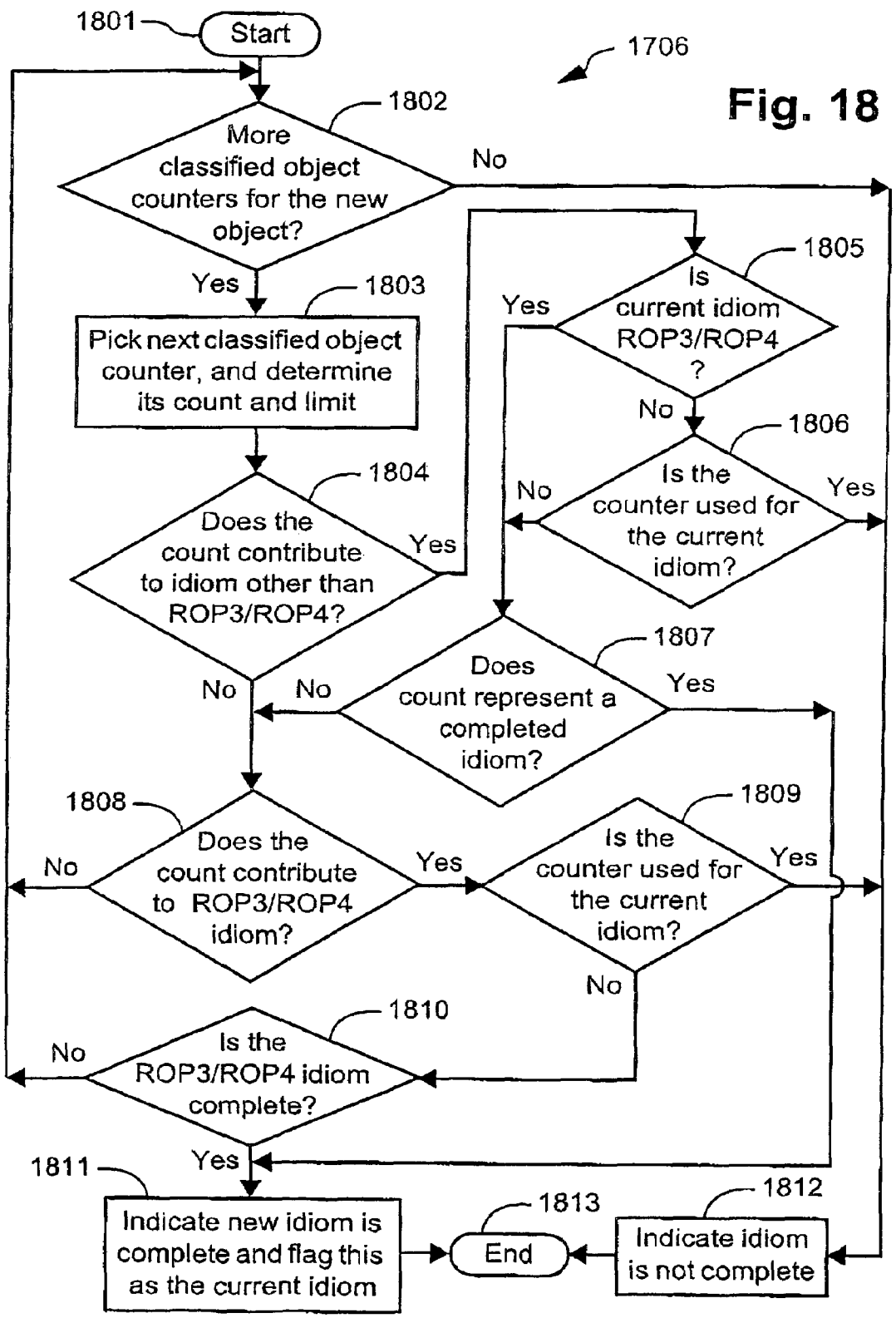
FIG. 18 shows a flowchart of the step of classified object counter examination used in the method of FIG. 17 for idiom recognition of idioms other than the ROP3/ROP4 idiom.

Process 1706, which examines counters of classified objects is further explained with reference to FIG. 18. The process 1706 starts in step 1801. Then, a test is performed in step 1802 as to whether any counters remain which have not yet been analyzed. If such unexamined counters do exist (the YES option of step 1802), processing moves to step 1803. It is possible that some object classification will result in no classified object counters, or that all counters will be processed without identifying an idiom, in which cases the test 1802 fails (the NO option of step 1802) and process execution moves immediately step 1812. In step 1812, 'no idiom complete' is indicated, after which the process 1706 ends in step 1813.

If there is at least one counter still to examine, the process moves from step 1802 to 1803. In step 1803, the next counter to be examined is chosen, and the current count and limit for the counter are read from the table structure described above. In step 1804, a test is made as to whether the chosen counter contributes to any idioms apart from the "many tiny ROP3 or ROP4 objects" idiom. This is done because all other idioms can be determined immediately from the counter, as described in the examples above. If the counter does contribute to another idiom (the YES option of step 1804), a test is made in step 1805 as to whether the current idiom is the "many tiny ROP3 or ROP4 objects" idiom.

The current idiom identifies any idiom which is currently operational for the current band. There is a current idiom for each band. The current idiom is initially set to no idiom. Thereafter, the current idiom tracks the most recently detected idiom for the band. Detection is done on a per band basis, only for idioms which are not currently running. Once an idiom has been detected, there is no point in continuing to re-detect it, even if the idiom persists for some time. So detection of the currently running idiom is skipped. As it is possible for a counter to contribute to both the "many tiny ROP3 or ROP4 objects" idiom and another idiom, the test is made in step 1805 to check that correct comparison is made at the following step.

If the current idiom is not the "many tiny ROP3 or ROP4 objects" idiom (the NO option of step 1805), process 1706 moves to step 1806, where a check is made as to whether the counter chosen in step 1803 contributes to the current idiom. If it does (the YES option of step 1806), execution proceeds to step 1812, in which process 1705 flags that no new idiom is complete. It is possible that the current idiom is still operating, but in this case there is no need to act.

If the current idiom is the "many tiny ROP3 or ROP4 objects" idiom (the YES option of step 1805), or if the counter chosen in step 1803 does not contribute to the current idiom (the NO option of step 1806), then execution proceeds to step 1807. Here a test is made as to whether the idiom is complete. The idiom is complete if the count becomes greater than or equal to the limit of objects being counted less the number of anomalies allowed for this idiom. The limit and number of anomalies allowed for each idiom has already been described in the examples of the idioms above.

In the described arrangements, each counter contributes at most to one other idiom apart from the "many tiny ROP3 or ROP4 objects" idiom. However if further idioms are added, a counter may contribute to multiple idioms. In this case, step 1807 would need to loop through all the possibly affected idiom limits and allowed anomalies to see it any idiom has been completed.

If in step 1807 it is found that an idiom is complete (the YES option of step 1807), execution moves to step 1811 in which the new idiom completion is indicated and this idiom is flagged as the current idiom. If in step 1807 it is found that the idiom is not complete (the NO option of step 1807), execution moves to step 1808. In step 1808, a test is made as to whether the count could contribute to the "many tiny ROP3 or ROP4 objects" idiom. If so (the YES option of step 1808), a test is made in step 1809 as to whether the counter chosen in step 1803 contributes to the current idiom. This is to avoid re-detecting the current idiom, as described previously. If the counter does contribute to the current idiom (the YES option of step 1809), process 1706 again moves to step 1812 as described above.

If the counter does not contribute to the current idiom (the NO option of step 1809), execution moves to step 1810. A test is made in step 1810 as to whether the "many tiny ROP3 or ROP4 objects" idiom is complete. This is further described with reference to FIG. 22. If the test in step 1808 indicated that the count could not contribute to the "many tiny ROP3 or ROP4 objects" idiom (the NO option of step 1808), execution returns to step 1802 to consider further counters (if any).

In step 1810, if the "many tiny ROP3 or ROP4 objects" idiom is not complete (the NO option of step 1810), the next counter is examined in step 1802 and the process is followed again for the next counter, if any. However, if the idiom is complete (the YES option of step 1810), execution proceeds to step 1811 where the new idiom is indicated as complete, and is flagged as the current idiom. The process 1706 then completes in step 1813.

It should be noted that only the counters associated with the new object just received in step 602 are examined in step 1802. This is because only those counters have been incremented, and hence only those counters could have increased in value. Thus only those counters could cause a new idiom to be detected. Any other counters would have caused an idiom to be detected when the objects contributing to them arrived and caused those counters to increment. Other counters are decremented in step 1703, but in the described arrangements decrementing counters does not cause an idiom to be detected.

Figure 19:
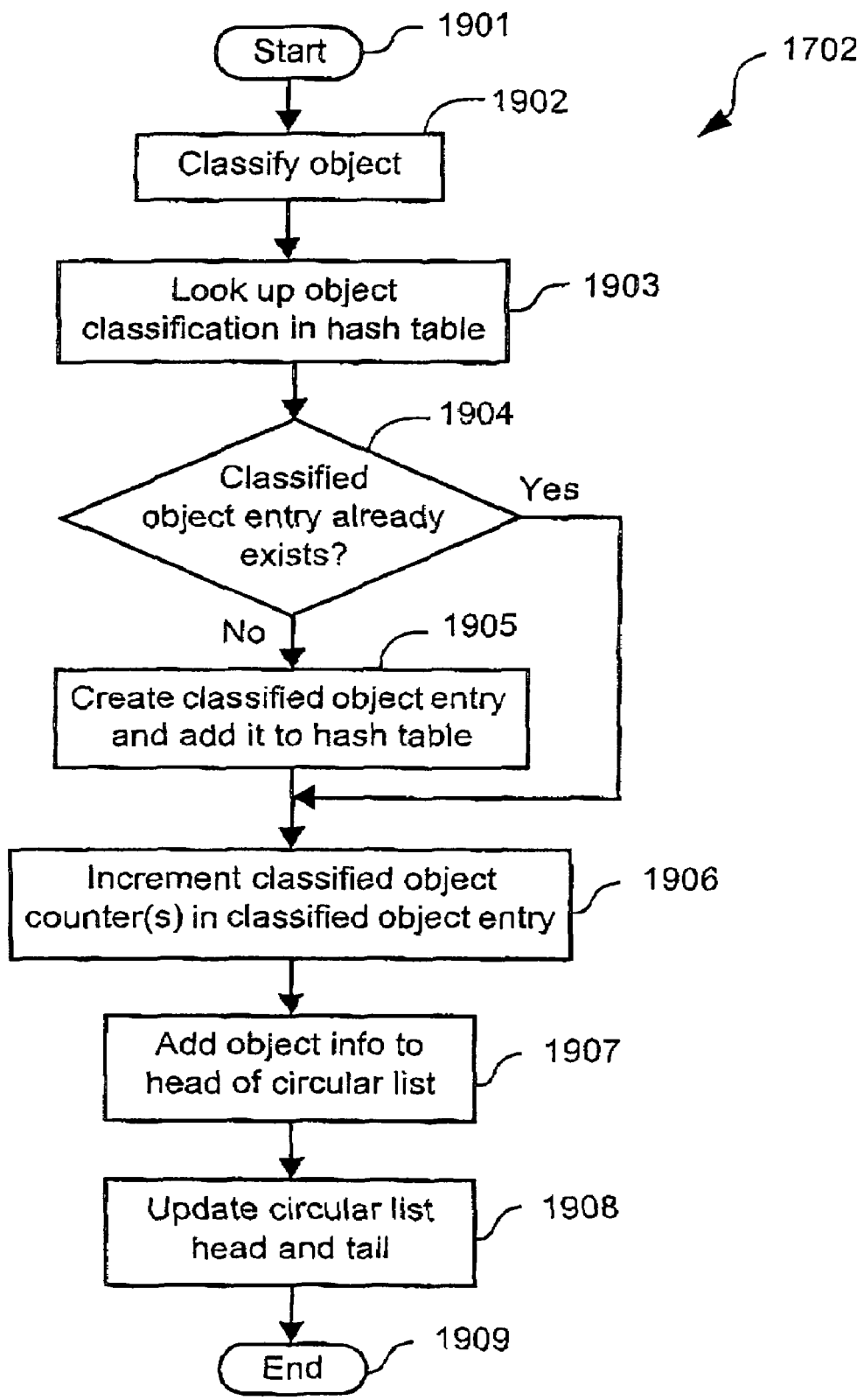
FIG. 19 shows a flowchart of the step of setting up object information in the method of FIG. 17.

The setup of a new object for idiom recognition in step 1702 is further explained with reference to FIG. 19. The process 1702 starts in step 1901. In the next step 1902, the object is classified. The object classification is done as previously described in the examples, and in the description of FIGS. 15 and 16. The object classification parameters 1540 are determined in step 1902. Next in step 1903, the object classification parameters 1540 are used to look up the hash table 1520 as described previously. In step 1904, a test is made as to whether the classified object entry already exists corresponding to these object classification parameters. If the entry does not exist (the NO option of step 1904), a new classified object entry corresponding to these object classification parameters is created in step 1905. The counters arc initialized to zero as part of the creation process. Execution then continues in step 1906.

If the classified object entry already existed (the YES option of step 1904), execution proceeds directly to step 1906, in which the counters for the classified object entry are incremented.

Next, the object information 1510 for the new object is added to the head of the circular list 1500 in step 1907. The addition of information overwrites the object information 1510 for the object received 100 objects ago, but as objects this old no longer contribute to any counters, their information is no longer required. The circular list head and tail indicators are then updated in step 1908 to reflect the current position in the circular list, and the process 1702 then completes in step 1909.

Figure 20:
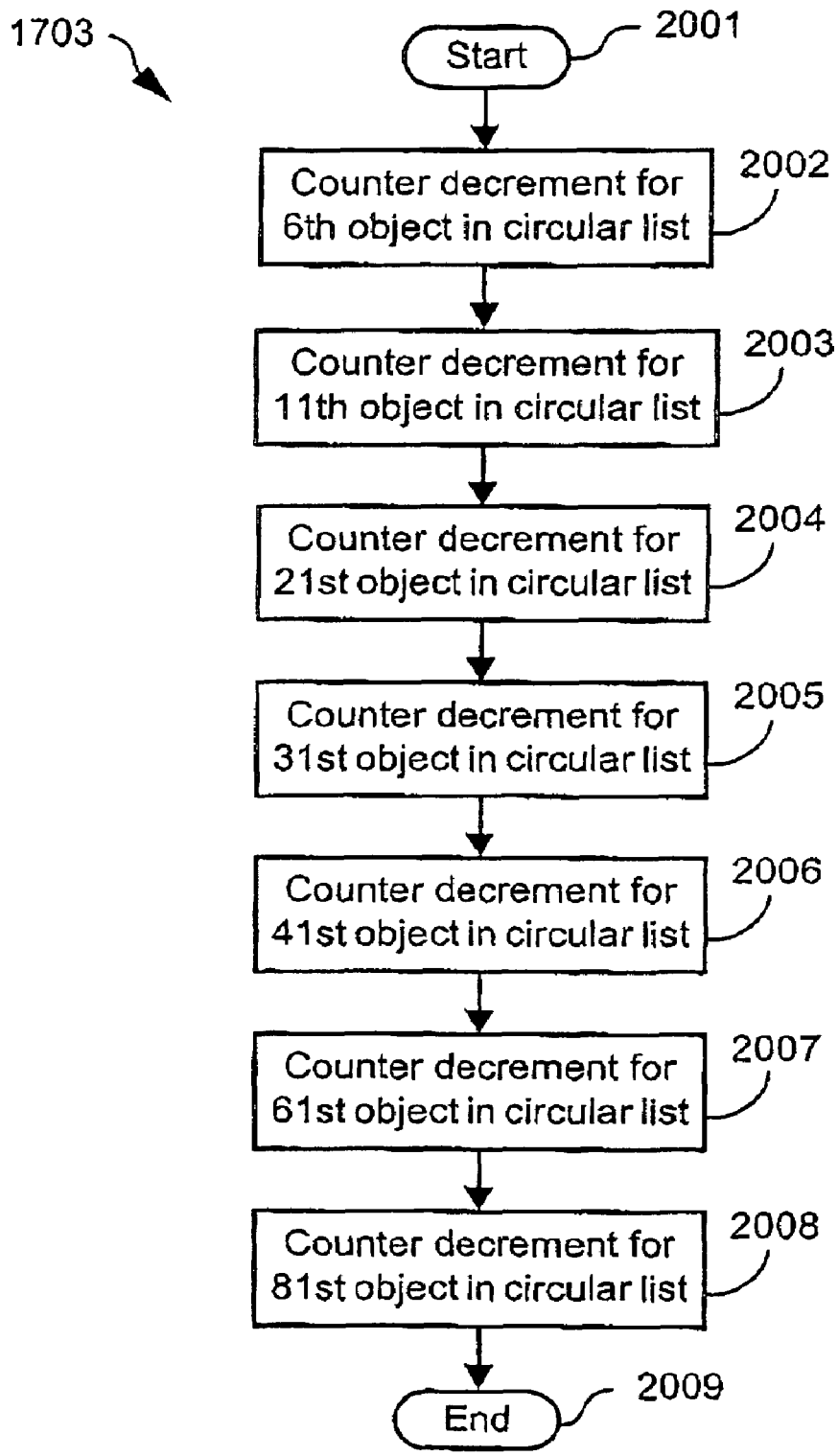
FIG. 20 shows a flowchart of describing how object information is removed for idiom recognition in the method of FIG. 17.
Figure 21:
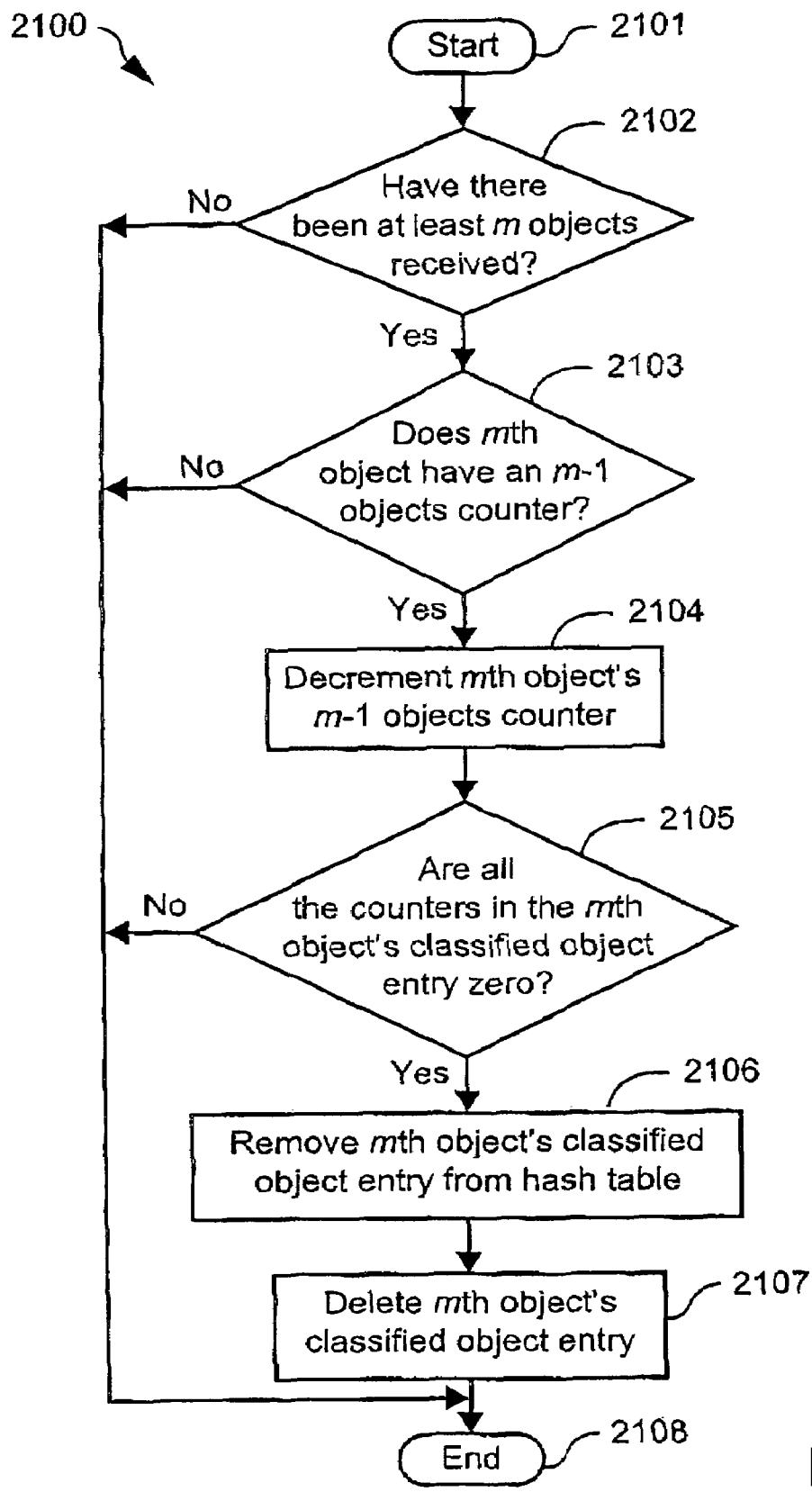
FIG. 21 shows further details of the method of FIG. 20.

FIG. 20 illustrates the process 1703 of decrementing the expiring classified object counters. In FIG. 20, the objects that are one position past the possible counter limits are examined to see if the objects have a counter associated with the limit just passed. The position of the object can be easily calculated knowing the length and the position of the head of the circular list 1500.

Process 1703 begins in step 2001. In step 2002, the object at the $6^{th}$ position in the circular list 1500 is examined, and the '5 objects' counter is decremented if the counter exists. The method of decrementing the counter is described in FIG. 21 as process 2100. The process 2100 will now be described for where m is 6, as required for step 2002. Process 2100 operates in an analogous fashion for other values of m.

The process 2100 begins in step 2101. In step 2102, a test is made as to whether there have been at least 6 objects received. If not (the NO option or step 2102), the process 2100 completes immediately in step 2108, if at least 6 objects have been received (the YES option of step 2102), then the values at the $6^{th}$ object position are valid. The process 2100 continues to step 2103, where a test is made as to whether the classified object entry for this object contains a counter for the object category in the last 5 objects. If it does not (the NO option of step 2103), process 2100 completes immediately. However, if the classified object entry does contain a counter for the object category in the last 5 objects (the YES option of step 2103), then that counter is decremented in step 2104.

In step 2105, a test is made to check if all the counters in the currently-considered classified object entry are now zero. If so (the YES option of step 2105), there cannot be any object information entries 1510 in the circular list 1500 still referencing this classified object entry. So in step 2106 this classified object entry is removed from the hash table, and deleted in step 2107. The process 2100 then completes in step 2108.

If at least one of the counters tested in step 2105 is non-zero (the NO option of step 2105), the process 2100 completes immediately in step 2108. The process 2100 applies equally to all classified object counters, and is used in the same way for all counter limits.

Returning now to FIG. 20, after step 2002 the process 1703 proceeds to step 2003, In step 2003, the classified object counters are decremented according to the process 2100 for the $11^{th}$ object in the circular list 1500 (i.e. with m=11). Next, in step 2004, the classified object counters arc decremented according to the process 2100 for the $21^{st}$ object in the circular list 1500. Next, in step 2005, the classified object counters are decremented according to the process 2100 for the $31^{st}$ object in the circular list 1500. Next, in step 2006, the classified object counters are decremented according to the process 2100 for the 41$^{st}$ object in the circular list 1500. Next, in step 2007, the classified object counters are decremented according to the process 2100 for the 61$^{st}$ object in the circular list 1500. And last, in step 2008, the classified object counters are decremented according to the process 2100 for the 81$^{st}$ object in the circular list 1500. The process 1703 then completes in step 2009.

The counters for the "many tiny ROP3 or ROP4 objects" idiom need not be close to the limit of the counter. For example, it is feasible to have only 20 small image objects in the last 80 objects, yet still have a valid "many tiny ROP3 or ROP4 objects" idiom. To check whether the "many tiny ROP3 or ROP4 objects" idiom is complete requires not only the counts to be checked, but also whether a pattern of suitable objects exists. The method of checking the counts and patterns will now be further explained with reference to FIG. 22.

Figure 22:
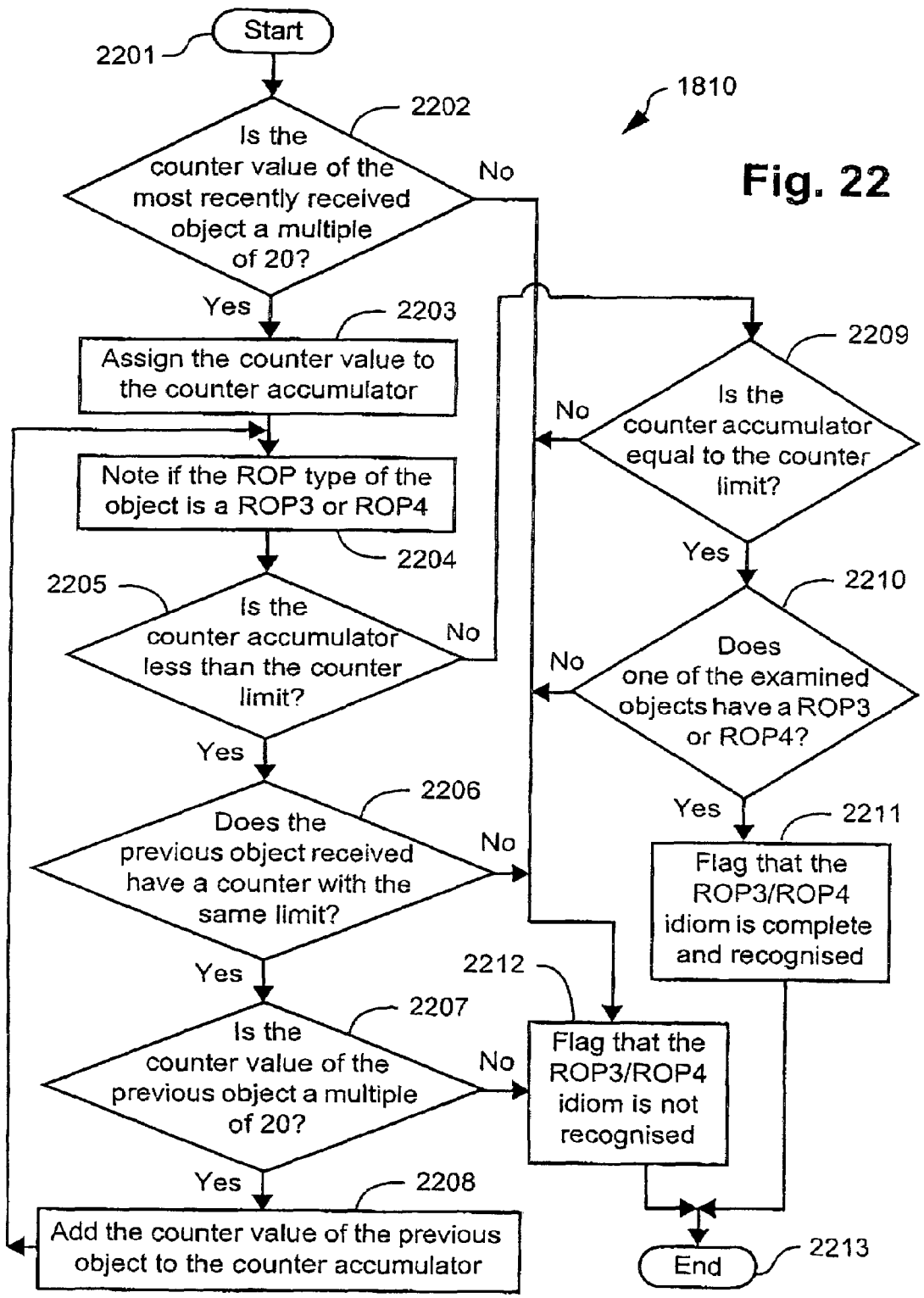
FIG. 22 shows a flowchart detailing how the ROP3/ROP4 idiom is recognized in the method of FIG. 18.

FIG. 22 describes in detail the method of achieving process 1810, which checks if the "many tiny ROP3 or ROP4 objects" idiom is complete. The process 1810 starts in step 2201. In step 2202, a check is made if the counter value of the counter currently being dealt with for the most recently received object is a multiple of 20. This is done because no anomalies are tolerated in the "many tiny ROP3 or ROP4 objects" idiom. The counters which could contribute to this idiom are those with limits of 20, 40, 60 and 80 objects. Each individual object classification that contributes to this idiom must therefore occur a multiple of 20 times for the idiom to be recognized. If the counter value is not a multiple of 20 (the NO option of step 2202), the idiom is not recognized, and the process 1810 proceeds to step 2212 where the idiom is flagged as 'not recognized', and the process 1810 completes in step 2213.

If the counter value is a multiple of 20 (the YES option of step 2202), execution proceeds to step 2203 where the counter value is assigned to a temporary counter accumulator.

Next in step 2204 the ROP type of the object is checked, and it is noted if a ROP3 or ROP4 is encountered. The reason for this is that sets of operands for a ROP3 or ROP4 can be presented separately, but the ROP3 or ROP4 itself is attached to only one or those operands. Consequently, the ROP values for some of the operands could be misleading. To conform to the idiom, at least one of the operands must be identified as being for a ROP3 or ROP4.

In step 2205, the counter accumulator value is tested against the limit of the counter picked in step 1803. If the counter accumulator is less than the counter limit (the YES option of step 2205), the next-most recently received object information is examined in step 2206. That is, the counter for the object which is the next most recently accessed via the circular list 1500 is tested in step 2206. To understand what is happening here, note that the counter accumulator must be a multiple of 20, as execution completes as soon as a non-multiple of 20 is found. Also, the counter limits are multiple of 20. So, if the counter accumulator is less than the counter limit in step 2205, there must be a multiple of 20 difference between the counter accumulator and the counter limit. Therefore adjacent objects are examined, with a view to finding a pattern of objects which will fill in the remaining multiples of 20. In step 2206, the closest object in the circular list which has not yet been examined is inspected to see if it has a counter with the same limit. If it does not (the NO option of step 2206), the pattern is broken and the idiom is not detected (step 2212). However if a counter with the same limit as the counter currently being detected for does exist (the YES option of step 2206), in step 2207 a check is made to see if the value in the counter for the adjacent object is a multiple of 20. If it is not (the NO option of step 2207), then the idiom is not detected and the process terminates in steps 2212 and 2213. If the counter value is a multiple of 20 (the YES option of step 2207), the counter value of the previous object is added to the counter accumulator in step 2208. Process flow then returns to step 2204 to test the ROP value of the adjacent object is tested, and execution proceeds to step 2205 again. Here, the counter accumulator is tested against the counter limit. If the counter accumulator is still less than the counter Limit, the next adjacent object is tested for its possibility to contribute to the idiom, and so on, until either the idiom recognition fails, or the counter accumulator becomes greater than or equal to the count limit. In the latter case (the NO option of step 2205), execution proceeds to step 2209.

In step 2209, the counter accumulator is tested for equality with the counter limit. If the counter accumulator is greater than the counter limit, then the idiom has not been recognized and the process terminates in steps 2212 and 2213. If the counter accumulator and the counter limit are equal, however (the YES option of step 2209), it means that one or more objects of suitable type have occurred exactly the right number of limes within the limit being tested. Furthermore, within the last few objects, objects of those types have occurred immediately one after the other. It is probable, but not guaranteed, that the object classifications occurred in the same pattern for the entire limit of objects being counted. However, it is guaranteed that small objects have occurred for the limit of the counter being examined, so in the unlikely event that the counts obtained were not done so through a regular pattern, it is very likely to be advantageous to switch renderers at this point anyway. A renderer which is good for the "many tiny ROP3 or ROP4 objects" idiom with a pattern sequence is also likely to be good for a sequence with all small objects and at least one ROP3 or ROP4.

In step 2210, reached from the YES option or step 2209, a check is made as to whether a ROP3 or ROP4 was encountered. If not (the NO option of step 2210), the idiom recognition fails and the process terminates in steps 2212 and 2213. Otherwise (the YES option of step 2210), finally the idiom is recognized and is complete, as flagged in step 2211. The process 1810 then completes in step 2213.

The arrangements of the present disclosure keep counters and check patterns in the sequence of arriving objects. The arrangements keep running statistics about each object classification, and use the statistics as a predictor of future behavior. An example of some idioms has been given. It is possible to keep many different sorts of statistics with a view to using the statistics and associated idioms as a predictor of future object variety arrival. This information can be used to choose the most suitable renderer for the expected objects.

There are many patterns which can be detected as idioms. These patterns cause either a pixel-sequential renderer 180 or a band renderer 165 (or any other renderer implemented in the printer system 145) to run slowly. Some example idioms have been given in the present description. But many more idioms exist, and can be implemented within the structure of the described arrangements.

For a pixel-sequential renderer 180, the problem areas may include idioms where there is a large density of small objects, or large arbitrarily rotated images. For a band renderer 165, the problem areas are large, non-image objects, large text and overlapping objects. If one of these idioms is detected, then the described arrangement switches away from the renderer which runs slowly, and switches to a renderer which performs better for the idiom detected.

The detected patterns are varied. There may be single objects which constitute an idiom in their own right. There may be repeated occurrences of one type of object which constitute an idiom. There may be repeated patterns of two, three, four or more types of objects which constitute an idiom. The idiom detection mechanism works for any known number, pattern, sequence and type of objects which can be identified as producing poor performance in a particular renderer. The idiom detection mechanism also works for any known number, pattern, sequence and type of objects which can be identified as producing good performance in a particular renderer.

Utilizing the idioms detected, it is possible to switch to, or stay wall, the best performing renderer available for the idiom detected. Any type of renderer can be chosen using this switching process. Any number of renderers can be supported in the switching process.

Operation of the Pixel-Sequential Renderer

Figure 23:
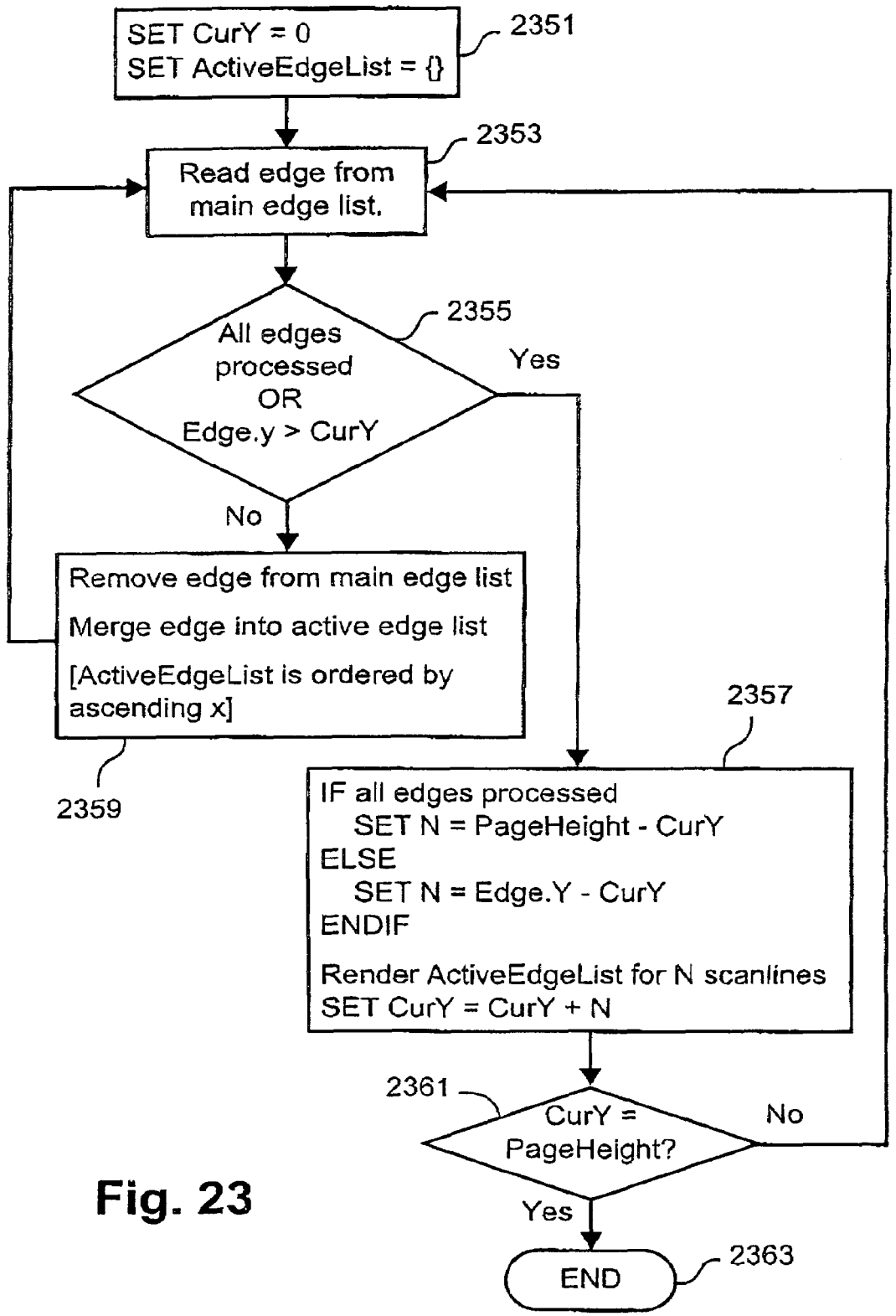
FIG. 23 is a flowchart of a method for determining the active edges of a main edge list used in a pixel-sequential renderer, and determining the number of scanlines for which this set of active edges should be rendered.
Figure 24:
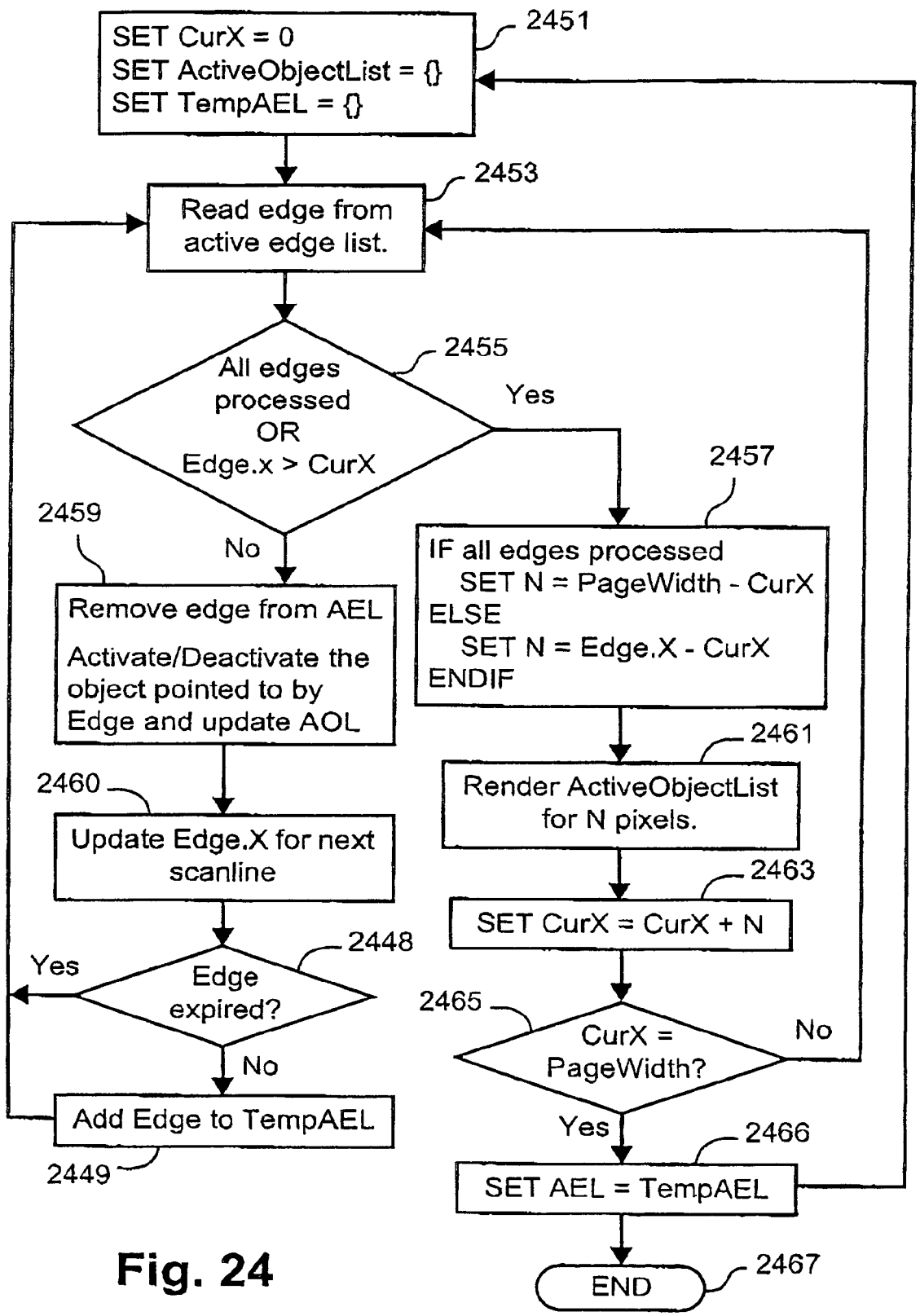
FIG. 24 is a flowchart of a method for rendering a scanline from the active edges calculated by the method steps of FIG. 23.
Figure 25:
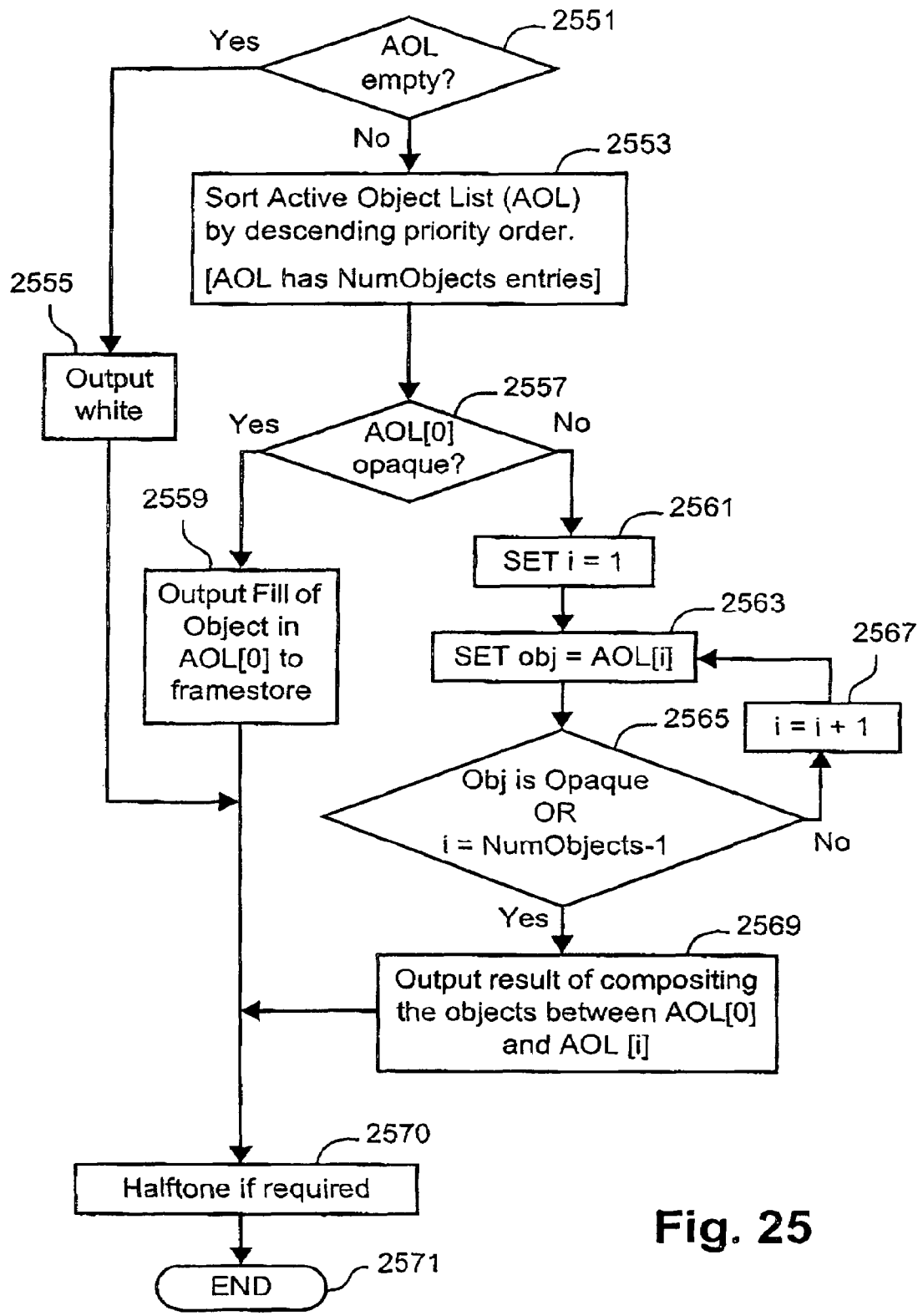
FIG. 25 is a flowchart of a method for determining which objects contribute to a pixel run in a pixel sequential rendering method described in FIGS. 23 and 24.

The operation of the pixel-sequential renderer 180 is described wish reference to FIGS. 23-25. The description is directed to a software implementation, but it will be understood that the methods may also be implemented in hardware, for example an ASIC. Objects rendered by the pixel-sequential renderer 180 are decomposed into three components:
  edges, describing the outline of the object;
  drawing information, describing how the object is drawn on the page; and
  fill information, describing the color of the object.

Outlines of objects are broken into up edges and down edges, where each edge proceeds monotonically down the page. An edge is assigned the direction up or down depending on whether tie edge activates or deactivates the object when scanned along a scanline.

In software, edges are implemented as a data structure. The data structure contains:
  points describing the outline of the edge;
  the x position of the edge on the current scanline; and
  edge direction.

Drawing information, or level data, is stored in a level data structure. The data structure typically contains:
  z-order integer, called the priority;
  a fill-rule, such as odd-even or non-zero-winding;
  information about the object (such as whether the object is a text object, graphic object or image object);
  a compositing operator;
  the type of fill being drawn, such as a bitmap, the, or flat color; and
  a clip-count, indicating how many clips are clipping this object.

Fill information, or fill data, is stored in a data structure called a fill data structure. The contents of the data structure depend on the fill type. For a bitmap fill, the data structure typically contains:
  x and y location of the bitmap origin on the page;
  width and height of the bitmap in pixels;
  a page-to-image transformation matrix;
  a value indicating the format of the image data, (for example 32 bpp RGBA, or 24 bpp BGR, etc. . . . ); and
  a pointer to the image data.

For a flat fill, the data structure typically contains a single 32 bit integer eight bits for each of the red, green, blue and alpha channels.

Each edge data structure generally has a pointer to a level data structure. Each level data structure also has a pointer to a fill data structure.

With the data structured in the described mariner, the display list can be rendered from the list of edges. This is referred to as an edge-based display list. The display list is firstly sorted by ascending y coordinate and then by ascending x coordinate when y coordinates are equal.

The pixel sequential renderer 180 generates the color and opacity for the pixels one at a time in raster scan order. At any pixel currently being scanned and processed, the pixel sequential renderer 180 composites only those exposed objects that are active at the currently scanned pixel. The pixel sequential rendering method determines that an object is active at a currently scanned pixel if that pixel lies within the boundary of the object. The renderer 180 achieves this by reference to a fill counter associated with that object. The fill counter keeps a running fill count that indicates whether the pixel lies within the boundary of the object. When the renderer 180 encounters an edge associated with the object it increments or decrements the fill count depending upon the direction of the edge The renderer 180 is then able to determine whether the current pixel is within the boundary of the object depending upon the fill count and a predetermined fill rule. The renderer 180 determines whether an active object is exposed with reference to a flag associated with that object. This flag associated with an object indicates whether or not the object obscures lower priority objects. That is, the flag indicates whether the object is partially transparent, in which case the lower priority active objects will make a contribution to the color and opacity of the current pixel. Otherwise, the flag indicates that the object is opaque, in which case active lower priority objects will not male any contribution to the color and opacity of the currently scanned pixel. The pixel sequential rendering method determines that an object is exposed if it is the uppermost active object, or if all the active objects above the object have their corresponding flags set to transparent. The renderer 180 then composites these exposed active objects to determine and output the color and opacity for the currently scanned pixel.

FIG. 23 is a flow chart illustrating how the active edges are determined from the main edge list in a Pixel-Sequential Rendering Method. The main edge list contains all the edges to be rendered, and the active edge list is a temporary list of edges that intersect a current scanline. While the method is described in terms of a software implementation, it will be understood that the method may also be implemented in hardware.

Step 2351 is an initializing step in which the variable CurY is set to zero and the active edge list is set to the empty set. Then, in step 2253, the renderer 180 reads an edge from the main edge list. In step 2355 the renderer 180 checks whether all edges in the main edge list have been processed, or whether the y-value of the currently-read edge, Edge.y, is greater than the value stored in the variable CurY.

If neither of these conditions is satisfied (the NO option of step 2355) then the process proceeds to step 2359, in which the current edge is merged into the active edge list. Edges in the active edge list are ordered by ascending x-value, i.e. the order along the scanline. Once the current edge is added to the active edge list, the process returns to step 2353 to consider the next edge from the main edge list.

If either of the conditions in step 2355 is satisfied (the YES option of step 2355), then in step 2357 the renderer 180 determines a number of scanlines to render, N. If all edges in the main edge list have been processed, N is set to the number of scanlines remaining on the page, i.e. the difference between the page height and the current scanline:

$N = \text{PageHeight} - \text{CurY}.$

If, however, there are still edges to process, then N is set to the number or scanlines between CurY and the scanline on which the currently-read edge commences:

$N=\text{Edge}.Y-\text{Cur}Y.$

Once the number of scanlines has been determined, the renderer 180 renders the active edge list for N scanlines and then updates the current scanline:

$\text{Cur}Y=\text{Cur}Y+N.$

For the pixel-sequential rendering method, the rendering of the N scanlines is further described with reference to FIG. 24.

Next, in step 2361, the renderer 180 checks whether the updated CurY is equal to the page height. If so, the process of determining active edges terminates 2363. If, however, CurY is less than the page height (the NO option of step 2361) then process flow returns to step 2353 to process the next edge from the main edge list.

The flowchart of FIG. 24 illustrates how scanlines are rendered in the pixel-sequential rendering method. The process of FIG. 24 is invoked by step 2357 of FIG. 23.

In the initializing step 2451, the rendering apparatus 180 sets an index CurX to zero and sets the active object list and a Temporary Active Edge List (TempAEL) to the empty set. Then, in step 2453, the process enters a loop that continues until the end of the scanline, i.e. when CurX equals the page width. In step 2453, the renderer 180 reads an edge "Edge" from the active edge list (AEL). Then, in step 2455, the renderer 180 checks whether all edges in the active edge list have been processed, or whether Edge.X, the intersection of the current scanline and the currently-read edge, is greater than the index CurX. If either of these conditions is met, process flow proceeds to step 2457. If the conditions are not met (the NO option of step 2455), process flow proceeds instead to step 2459.

In step 2459, the currently-read edge is removed from the AEL and the object pointed to by the currently-read edge is activated or deactivated as appropriate. The activation/deactivation of objects is based on the fill rule associated with the object. Objects are either added to or removed from an active object list (AOL).

In the following step 2460, Edge.X is updated to indicate the intersection of tho currently-read edge with the next scanline. Next, in step 2448, the currently-read edge is tested to see if it expires on the current scanline. If not, execution proceeds to step 2449 where the edge is added to the temporary AEL, TempAEL, in the correct position to maintain the ascending x-order of that list. Otherwise, and following step 2449, process flow returns to step 2453 to read the next edge from the active edge list.

In step 2457 a number of pixels to render, N, is determined. If all edges in the active edge list have already been processed, N is set to the difference between the page width and the index CurX. Otherwise N is set to (Edge.X−CurX), i.e. the difference between the current index and the position of the currently-considered active edge.

Then, in step 2461, the active object list is rendered for N pixels, as described in more detail with reference to FIG. 25.

In step 2463 the index CurX is updated to (CurX+N) and step 2465 checks whether CurX equals the page width. If so, in step 2466 the contents of the temporary edge list are copied to the active edge list. The process then either loops back to step 2451 to render the next scanline, or returns 2467 to step 2357 of FIG. 23. If CurX has not reached the page width (the NO option of step 2465), then process flow returns to step 2453.

The flowchart of FIG. 25 illustrates a method of rendering pixels on a scanline in which only the highest opaque object and any transparent objects lying above the highest opaque object are composited and output. The steps of FIG. 25 are invoked by step 2461 of FIG. 24.

In step 2551 the renderer 180 checks whether the active object list (AOL) is empty. If so, the renderer 180 outputs white (the page background) for N pixels, halftoning in step 2570 (if required) to the bit depth of the framestore. The process terminates in step 2571 and returns to step 2463.

If the active object list is not empty (the NO option of step 2551) then process flow proceeds to step 2553, in which the active object list is sorted by descending priority order. The number of entries in the active object list is NumObjects.

Then, in step 2557, the renderer 180 checks whether the first object in the active object list is opaque. If so, step 2559 outputs the fill of the object in AOL[0] to the framestore, halftoning in step 2570 (if required) to the bit depth of the framestore, and the process terminates in step 2571. In this case there is no need to consider any other objects in the active object list, since the topmost object is opaque.

If the topmost object is not opaque (the NO option of step 2557) then the renderer in step 2561 sets index i=1. In step 2563 Obj is set to the object in the ith entry of the active object list. Step 2565 checks whether Obj is opaque or whether the index i equals the total number of objects, (NumObjects−1), in the active object list.

If either condition is met (the YES option of step 2565) then the renderer 180 in step 2569 outputs the result of compositing all objects between AOL[0] and AOL[i] to the framestore, halftoning in step 2570 (if required) to the bit depth of the framestore. The process then terminates in step 2571.

If neither of the conditions in step 2565 is met (the NO option of step 2567), then process flow proceeds to step 2567, which increments the index, i=i+1. The process then returns to step 2563 to consider the next object in the active object list.

INDUSTRIAL APPLICABILITY

It is apparent from the above that the disclosed methods are applicable to the data processing industries.

The foregoing describes only some embodiments of the present invention, and modifications and/or changes can be made thereto without departing from the scope and spirit of the invention, the embodiment(s) being illustrative and not restrictive. The disclosure is presented primarily in terms of a printer engine. However, the disclosed arrangements may be used in any system that requires a renderer.

The claims defining the invention are as follows:

1. A method of rendering a sequence of graphical objects where two or more different renderers are available and one of the renderers is designated as a currently-used renderer, said method comprising the steps of:

receiving a current object in the sequence of graphical objects;

adding the current object to a set of recently-received objects;

checking whether any one of a predetermined group of patterns of objects is present in the set, each pattern having an associated indication of the suitability of the available renderers for the pattern, the suitability being dependent on a time taken to render the pattern;

determining a suitable renderer from the available renderers using a pattern and associated indication identified in said checking step;

switching from the currently-used renderer to the suitable renderer if the suitable renderer is different to the currently-used renderer; and rendering the determined renderer to at least one of a memory and an output device, wherein the steps are performed on a computer.

2. The method according to claim 1 wherein said adding step comprises the steps of:

classifying the current object as a member of one or more classes; and incrementing a classified object counter associated with each of the classes.

3. The method according to claim 2 wherein said checking step identifies that a pattern is present in the set if one or more classified object counters that correspond to the pattern reach predetermined limits.

4. The method according to claim 3 wherein the classified object counters are each maintained for a corresponding range of recently-received objects and, if an object no longer falls within one of the ranges, the corresponding classified object counter is decremented.

5. The method according to claim 1 wherein said switching step comprises the steps of:

rendering, using the currently-used renderer, received objects that have not yet been rendered; and designating the suitable renderer as the currently-used renderer.

6. The method according to claim 5 wherein said rendering step is conditional on a state of a flag that is toggled at each switch between renderers.

7. The method according to claim 6 wherein the flag is not toggled if a switch between renderers is caused by a pattern comprising a single object.

8. The method according to claim 1 wherein a page to be rendered is divided into a plurality of bands and wherein said adding, checking, determining and switching steps are performed for each band occupied by the received object.

9. A method according to claim 1 wherein the set is maintained in a circular list such that, if the circular list is full, said adding step overwrites the oldest entry in the list with the current object.

10. A method according to claim 2 wherein a hash table is used to associate objects in the set with the classified object counters.

11. A method according to claim 1 wherein the indication indicates that the associated pattern causes one or more of the available renderers to render slowly.

12. A method according to claim 1 wherein the indication indicates that the associated pattern is rendered efficiently by one of the available renderers.

13. A method according to claim 12 wherein a flag is set such that objects in the pattern which cause identification of the efficient renderer are rendered by the efficient renderer.

14. A method according to claim 1 wherein the pattern is selected from the group consisting of:

one or more large, arbitrarily rotated images;
many tiny objects having blended color;
many tiny images;
many small objects having flat color;
many tiny ROP3 objects;
many tiny ROP4 objects;
overlapping objects;
large amounts of text;
large objects having blended color; and
large objects having flat color.

15. A method according to claim 14 wherein a pattern comprising a large, arbitrarily rotated image is identified if the image has more than 256 kbytes of image data, is rotated by an angle substantially different to zero and has a resolution greater than half a page resolution in both x and y dimensions.

16. A method according to claim 14 wherein a pattern comprising many tiny objects having blended color is identified if at least eighteen of the last twenty objects have substantially the same shape and size, three to twelve straight edge segments, blended color and a bounding box having at least one side less than or equal to 30 pixels.

17. A method according to claim 14 wherein a pattern comprising many tiny images is identified if at least 27 of the last 30 objects are images that are less than three pixels in size.

18. A method according to claim 14 wherein a pattern comprising many small objects having flat color is identified if at least 18 of the last 20 objects have flat color and a bounding box having at least one side less than or equal to 30 pixels.

19. A method according to claim 14 wherein a pattern comprising many tiny ROP3 objects is identified if more than 20 contiguous series of the form "clip, image, flat ROP3" or "image, flat ROP3" are received and the objects have a bounding box with at least one side less than 30 pixels.

20. A method according to claim 14 wherein a pattern comprising many tiny ROP4 objects is identified if more than 20 contiguous series of the form "clip, image, flat, bitmap ROP4" or "image, flat, bitmap ROP4" are received and the objects have a bounding box with at least one side less than 30 pixels.

21. A method according to claim 14 wherein a pattern comprising overlapping objects is identified if the last 9 objects are greater than 100 pixels in both x and y dimensions and the bounding boxes of at least three of the objects overlap the bounding box of one or more other objects by at least 20 pixels.

22. A method according to claim 14 wherein a pattern comprising large amounts of text is identified if at least 28 of the last 30 objects are characters larger than 40 pixels in both the x and y dimensions.

23. A method according to claim 14 wherein a pattern comprising large objects having blended color is identified if at least 4 of the last 5 objects are larger than 100 pixels in both x and y dimensions and have fills which are blended colors.

24. A method according to claim 14 wherein a pattern comprising large objects having flat color is identified if at least 4 of the last 5 objects are larger than 100 pixels in both x and y dimensions and have fills which are flat colors.

25. A method according to claim 1 wherein one of the available renderers is a pixel-sequential renderer that only renders those portions of objects in a list of objects that are not obscured by opaque objects in the list.

26. A method of rendering a sequence of graphical objects in an environment where two or more different renderers are available and one of the renderers is designated as a current renderer, said method comprising the steps of a) accumulating counts of different features of sequentially presented graphical objects;

b) determining, based on the counts, an appropriate renderer for rendering the sequentially presented graphical objects;

c) determining, based on the counts, an inappropriate renderer for rendering the sequentially presented graphical objects;

e) if the current renderer is determined to be inappropriate, switching to the appropriate renderer; and f) rendering the graphical objects with the appropriate renderer to at least one of a memory and an output device, wherein the steps are performed on a computer.

27. A computer apparatus for rendering a sequence of graphical objects where two or more different renderers are available and one of the renderers is designated as a currently-used renderer, said apparatus comprising:

a processor and a memory, said processor being operable to:

receive a current object in the sequence of graphical objects from the memory;

add the current object to a set of recently-received objects;

check whether any one of a predetermined group of patterns of objects is present in the set, each pattern having an associated indication of the suitability of the available renderers for the pattern, the suitability being dependent on a time taken to render the pattern;

determine a suitable renderer from the available renderers using an identified pattern and associated indication; and switch from the currently-used renderer to the suitable renderer if the suitable renderer is different to the currently-used renderer.

28. A system for rendering a sequence of graphical objects, said system comprising:

two or more different renderers for rendering the sequence, one of the renderers being designated as a currently-used renderer;

data storage for storing a set of recently-received objects in the sequence;

a memory having a program stored therein; and a processor, in communication with said memory, said data storage and said two or more renderers, to execute the program to:

receive a current object in the sequence of graphical objects;

add the current object to the set of recently-received objects;

check whether any one of a predetermined group of patterns of objects is present in the set, each pattern having an associated indication of the suitability of the available renderers for the pattern, the suitability being dependent on a time taken to render the pattern;

determine a suitable renderer from the available renderers using a pattern and associated indication identified by said check; and switch from the currently-used renderer to the suitable renderer if the suitable renderer is different to the currently-used renderer.

29. A computer readable storage medium encoded with a computer program code, the program code being executable by a data processing apparatus to render a sequence of graphical objects where two or more different renderers are available and one of the renderers is designated as a currently-used renderer, said program code comprising:

code for receiving a current object in the sequence of graphical objects;

code for adding the current object to a set of recently-received objects;

code for checking whether any one of a predetermined group of patterns of objects is present in the set, each pattern having an associated indication of the suitability of the available renderers for the pattern, the suitability being dependent on a time taken to render the pattern;

code for determining a suitable renderer from the available renderers using a pattern and associated indication identified in said checking step; and code for switching from the currently-used renderer to the suitable renderer if the suitable renderer is different to the currently-used renderer.

* * * * *